United States Patent
Xu

(10) Patent No.: US 12,166,842 B2
(45) Date of Patent: Dec. 10, 2024

(54) APPLICATION FUNCTION INFLUENCE IN APPLICATION CONTEXT RELOCATION

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/029,121

(22) PCT Filed: Sep. 28, 2021

(86) PCT No.: PCT/IB2021/058865
§ 371 (c)(1),
(2) Date: Mar. 29, 2023

(87) PCT Pub. No.: WO2022/070042
PCT Pub. Date: Apr. 7, 2022

(65) Prior Publication Data
US 2023/0388395 A1    Nov. 30, 2023

(30) Foreign Application Priority Data
Sep. 29, 2020    (WO) ................ PCT/CN2020/118631

(51) Int. Cl.
*H04L 67/60*    (2022.01)
(52) U.S. Cl.
CPC .................................. *H04L 67/60* (2022.05)
(58) Field of Classification Search
None
See application file for complete search history.

(56) References Cited

U.S. PATENT DOCUMENTS

2022/0330128 A1*  10/2022  Kim ................. H04W 28/0226

OTHER PUBLICATIONS

Author Unknown, "Technical Specification Group Services and System Aspects; System architecture for the 5G System (5GS); Stage 2 (Release 16)," Technical Specification 23.501, Version 16.6.0, Sep. 2020, 3GPP Organizational Partners, 447 pages.
Author Unknown, "Technical Specification Group Services and System Aspects; Procedures for the 5G System (5GS); Stage 2 (Release 16)," Technical Specification 23.502, Version 16.6.0, Sep. 2020, 3GPP Organizational Partners, 597 pages.
Author Unknown, "Technical Specification Group Services and System Aspects; Architecture for enabling Edge Applications; (Release 17)," Technical Specification 23.558, Version 1.0.0, Sep. 2020, 3GPP Organizational Partners, 103 pages.
Ericsson, "S6-20xxxx: AF influence in Application Context Relocation," 3GPP TSG-SA WG6 Meeting #39-e-bis, Oct. 12-20, 2020, Electronic Meeting, 11 pages.

(Continued)

*Primary Examiner* — June Sison
(74) *Attorney, Agent, or Firm* — Withrow & Terranova, PLLC

(57) ABSTRACT

Methods performed by an Edge Data Network (EDN) and a User Equipment (UE) for enabling Application Context Change (ACR) are disclosed. More specifically, methods performed by a UE and an EDN node for enabling ACR are provided. The method disclosed herein can provide solutions to many open issues in the Third-Generation Partnership Project standard with respect to applying Application Function (AF) influence during an ACR.

6 Claims, 21 Drawing Sheets

(56) References Cited

OTHER PUBLICATIONS

Qualcomm Incorporated, "S6-200679: Pseudo-CR on UE <-> Edge application context transfer," 3GPP TSG-SA WG6 Meeting #37-e, May 14-26, 2020, Electronic Meeting, 6 pages.
Samsung, "S6-191700: New solution for application context relocation," 3GPP TSG-SA WG6 Meeting #33, Sep. 2-6, 2019, Sophia Antipolis, France, 5 pages.
Samsung, "S6-200882: pCR on application context relocation," 3GPP TSG-SA WG6 Meeting #37-e, May 14-26, 2020, Electronic Meeting, 4 pages.
Samsung, "S6-201055: Application context relocation initiated by EEC," 3GPP TSG-SA WG6 Meeting #38-e, Jul. 20-31, 2020, Electronic Meeting, 4 pages.
International Search Report and Written Opinion for International Patent Application No. PCT/IB2021/058865, mailed Dec. 22, 2021, 16 pages.
Written Opinion for International Patent Application No. PCT/IB2021/058865, mailed Sep. 6, 2022, 10 pages.
International Preliminary Report on Patentability for International Patent Application No. PCT/IB2021/058865, mailed Dec. 20, 2022, 37 pages.

* cited by examiner

APPLICATION FUNCTION INFLUENCE IN APPLICATION CONTEXT RELOCATION

RELATED APPLICATIONS

This application is a 35 U.S.C. § 371 national phase filing of International Application No. PCT/IB2021/058865, filed Sep. 28, 2021, which claims the benefit of International Application No. PCT/CN2020/118631, filed Sep. 29, 2020, the disclosures of which are hereby incorporated herein by reference in their entireties.

TECHNICAL FIELD

The technology of the disclosure relates generally to applying Application Function (AF) influence during an Application Context Relocation (ACR).

BACKGROUND

Edge Computing Application Enabler Introduction
(See TS 23.558 v1.0.0 Clauses 1 and 6)

Third Generation Partnership Project (3GPP) TS 23.558 specifies the application layer architecture, procedures, and information flows necessary for enabling edge applications over 3GPP networks. The specification includes architectural requirements for enabling edge applications, application layer architecture fulfilling the architecture requirements, and procedures to enable the deployment of edge applications.

One of the main areas of focus is to minimize the impact on edge based applications so as to avoid major application redevelopment for User Equipment (UE) use at the edge.

FIG. 1 shows an architecture for enabling edge applications. An Edge Data Network (EDN) is a local Data Network. An Edge Application Server(s) (EAS(s)) and an Edge Enabler Server (EES) are contained within the EDN. An Edge Configuration Server (ECS) provides configurations related to the EES, including details of the EDN hosting the EES. The UE contains Application Client(s) (AC(s)) and an Edge Enabler Client (EEC). The EAS(s), the EES, and the ECS may interact with the 3GPP Core Network (CN).

An EDGE-1 reference point enables interactions between the EES and the EEC. Specifically, the EDGE-1 reference point supports:

a) registration and de-registration of the EEC to the EES;
b) retrieval and provisioning of EAS configuration information; and
c) discovery of the EAS available in the EDN.

Service Continuity (See Details in TS 23.558, cl.8.8)

Support service continuity in the enabling layer allows ACs in the UE to minimize service interruption while replacing the serving EAS, called source EAS (S-EAS), with a target EAS (T-EAS).

Generally, the S-EAS is associated with an application context. To support service continuity, this application context from the S-EAS is transferred to a T-EAS.

The following scenarios are supported for service continuity:
UE mobility, including predictive or expected UE mobility for the following cases:
inter-EDN UE mobility; and
Local Area Data Network (LADN)-related UE mobility.
Overload situations in S-EAS or EDN for the following cases:
intra-EDN;
inter-EDN; and
LADN-related.
Maintenance aspects for the following case:
graceful shutdown of an EAS.
To support the need for Application Context Relocation (ACR), the following entity roles are identified:
detection entity, detecting the need of application context relocation;
decision-making entity, deciding that the application context relocation is required; and
execution entity, executing application context relocation.

A detection entity detects the probable need for application context relocation by monitoring various aspects, such as UE's location and indicates to the decision-making entity to determine whether the application context relocation is required. The following entities can potentially perform the detection role:
Application Client (AC);
Edge Enabler Client (EEC);
Edge Enabler Server (EES); and
Edge Application Server (EAS).

A high-level overview of ACR is illustrated in FIG. 2. As shown in FIG. 2, the ACR includes 4 phases, wherein phase 3 includes the "application context relocation" among AC, S-EAS and T-EAS.

TS 23.558 describes five end to end scenarios in clause 8.8.2. FIG. 3 illustrates one of the scenarios, in which the ACR is initiated by a UE.

SUMMARY

Embodiments disclosed herein include methods performed by an Edge Data Network (EDN) and a User Equipment (UE) for enabling Application Context Change (ACR). More specifically, methods performed by a UE and an EDN node for enabling ACR are provided. The method disclosed herein can provide solutions to many open issues in the Third-Generation Partnership Project (3GPP) standard with respect to applying Application Function (AF) influence during an ACR.

In one embodiment, a method performed by a UE for enabling ACR is provided. The method includes determining whether an ACR is needed in EDN. The method also includes providing, to an EDN node, a request message to request the ACR. The request message comprises an Edge Application Server, EAS, notification indication for notifying an EAS that the ACR is needed. The method also includes receiving a response message from the EDN node that indicates a result of the ACR.

In an embodiment, determining whether the ACR is needed comprises determining that a Target-Edge Application Server, T-EAS, in the EDN needs to be used for an application traffic.

In an embodiment, providing the request message comprises providing the request message to a Source-Edge Enabler Server, S-EES, in the EDN and receiving the response message comprises receiving the response message from the S-EES in the EDN.

In an embodiment, the ACR request message further comprises either one or both of: a UE Identification, UEID and a T-EAS endpoint and Data Network Access Identifier, DNAI.

In an embodiment, the ACR is initiated by an Application Client, AC, or an Edge Enabler Client, EEC, in the UE and the EAS notification flag is set to FALSE to cause the S-EES not to notify the T-EAS that the ACR is needed.

In an embodiment, the ACR is executed by an Edge Enabler Client, EEC, in the UE and the EAS notification flag is set to TRUE to cause the S-EES to notify the T-EAS that the ACR is needed.

In another embodiment, a wireless device is provided. The wireless device includes processing circuitry. The processing circuitry is configured to cause the wireless device to determine whether an ACR is needed in an EDN. The processing circuitry is also configured to cause the wireless device to provide, to an EDN node, a request message to request the ACR. The request message comprises an EAS notification indication to request the ACR for notifying an EAS that the ACR is needed. The processing circuitry is also configured to cause the wireless device to receive a response message from the EDN node that indicates a result of the ACR.

In an embodiment, the processing circuitry further configured to cause the wireless device to perform any of the steps in any of the claims performed by the UE.

In another embodiment, a method performed by an ED, node in an EDN for enabling ACR is provided. The method includes receiving, from a UE, a request message to request the ACR. The request message comprises an EAS notification indication for notifying an EAS that an ACR is needed. The method also includes determining whether the UE is authorized to perform the ACR. The method also includes performing the ACR in response to determining that the UE is authorized to perform the ACR. The method also includes sending a response message to the UE to indicate a result of the ACR.

In an embodiment, the EDN node is an S-EES in the EDN.

In an embodiment, the ACR request message further comprises either one or both of: a UEID and a T-EAS endpoint and DNAI.

In an embodiment, the ACR is initiated by an AC or an EEC in the UE and the EAS notification flag is set to FALSE to cause the S-EES not to notify a T-EAS in the EDN that the ACR need to be performed in the EDN.

In an embodiment, the ACR is executed by an EEC in the UE and the EAS notification flag is set to TRUE to cause the S-EES to notify the T-EAS that the ACR need to be performed in the EDN.

In an embodiment, performing the ACR further comprises applying AF traffic influence with N6 routing information provided from the S-EES to the T-EAS in the EDN.

In an embodiment, the EDN node is a T-EES in the EDN.

In an embodiment, performing the ACR further comprises providing N6 routing information from the T-EES to a T-EAS in the EDN.

In another embodiment, network node is provided. The network node includes processing circuitry. The processing circuitry is configured to cause the network node to receive, from a UE, a request message to request the ACR. The request message comprises an EAS notification indication for notifying an EAS that an ACR is needed. The processing circuitry is configured to cause the network node to determine whether the UE is authorized to perform the ACR. The processing circuitry is configured to cause the network node to perform the ACR in response to determining that the UE is authorized to perform the ACR. The processing circuitry is configured to cause the network node to send a response message to the UE to indicate a result of the ACR.

In an embodiment, the processing circuitry is configured to cause the network to perform any of the steps in any of the claims performed by the EDN node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
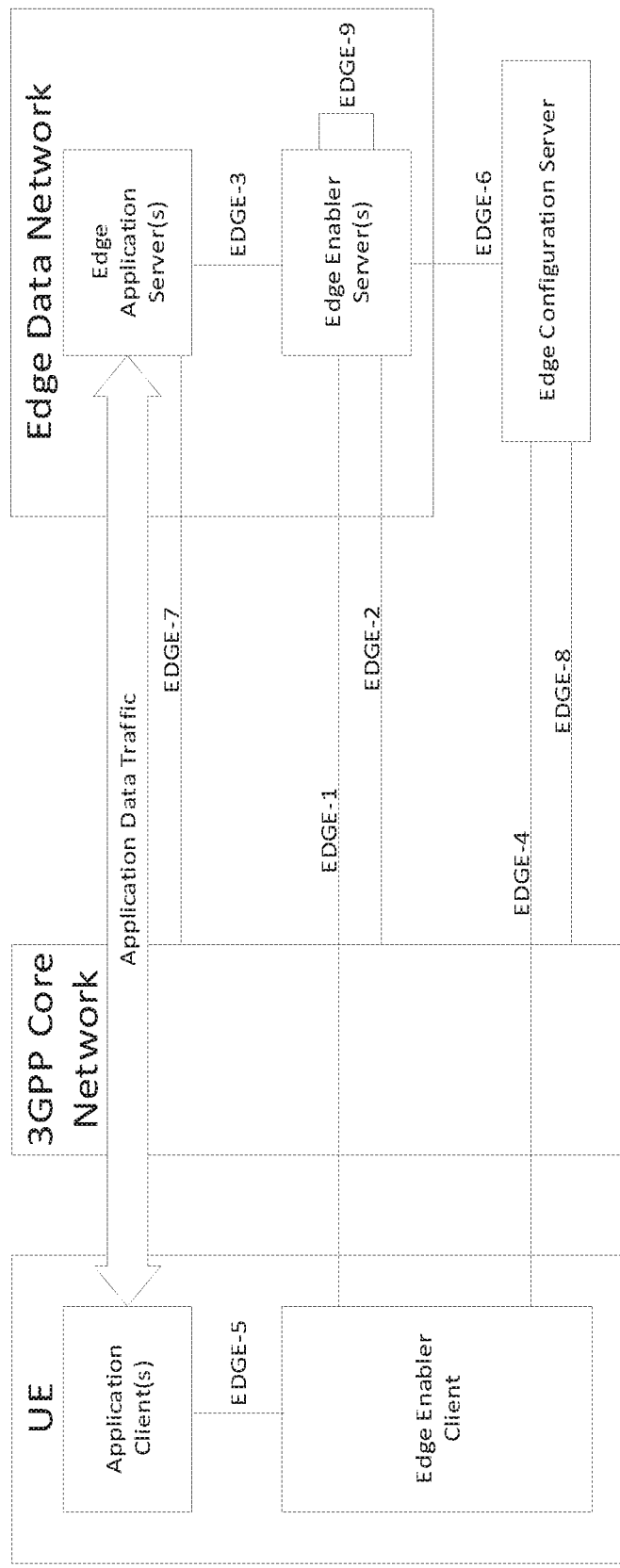
FIG. 1 illustrates an architecture for enabling edge applications.
Figure 2:
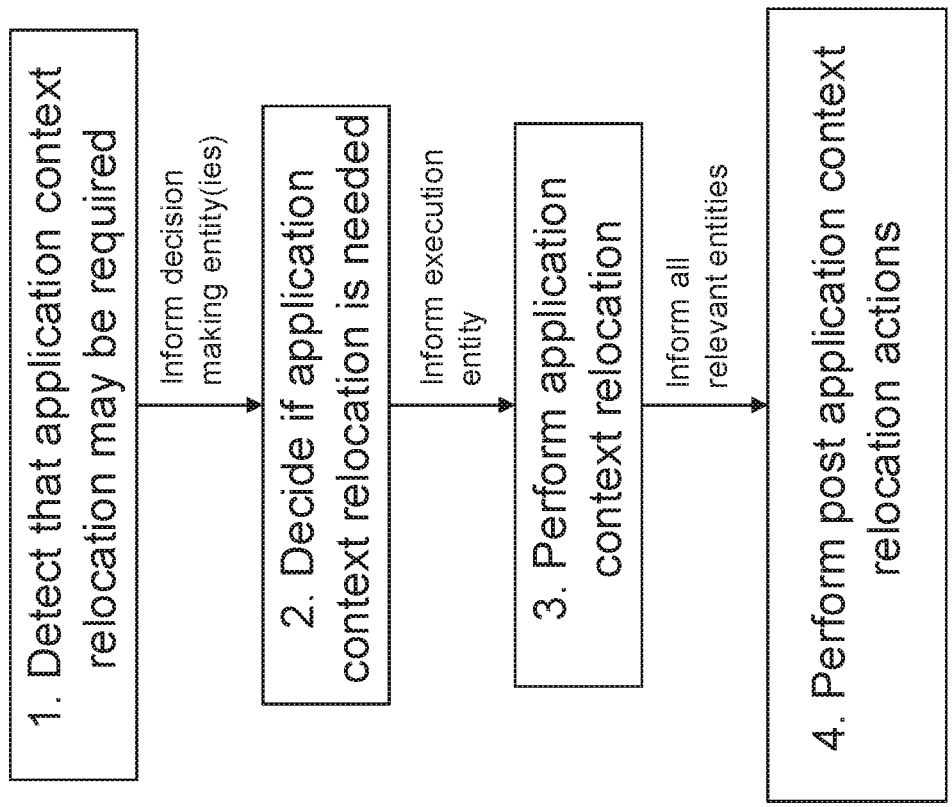
FIG. 2 is a flowchart providing a high-level overview of an application context relocation procedure.
Figure 3:
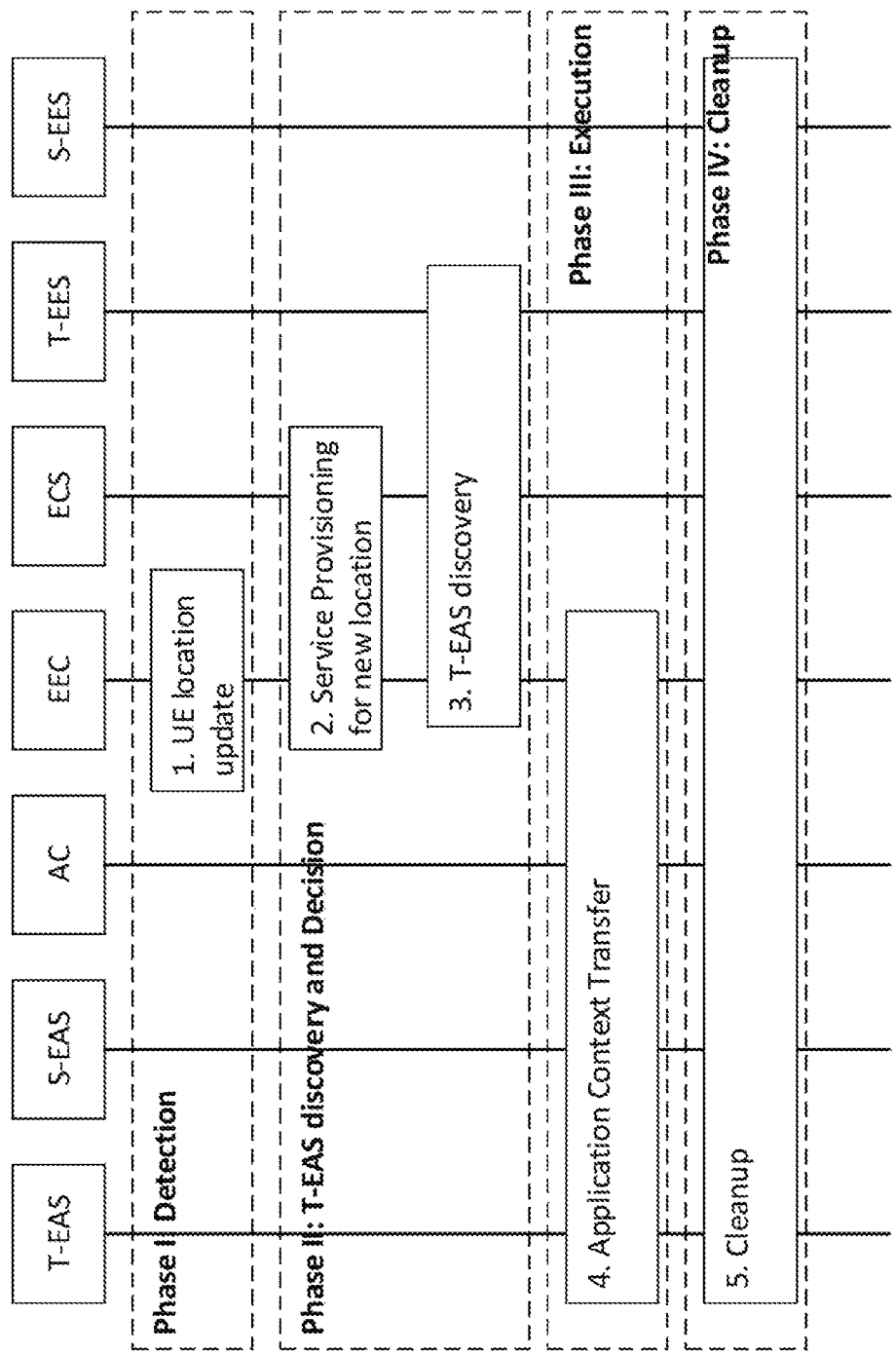
FIG. 3 illustrates application context relocation initiated by an Edge Enabler Client (EEC) and Application Clients (ACs)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist a certain challenge(s). With respect to service continuity, there is an Editor's Note as to when and which entity triggers Application Function (AF) influence for the EAS traffic in a 3GPP CN:

Editor's note: It is FFS (For Further Study) what information is required in the Application Context Relocation completion. It is also FFS when and which entity triggers the AF influence for the EAS traffic in the 3GPP CIV.

Such Editor's Note is also made in different end to end scenarios as follows:

Editor's Note: How the EEC modifies user plane connectivity for the AC is FFS.

Editor's Note: How the EES influences 3GPP Core Network in this procedure to modify user plane connectivity for the UE is FFS.

With so many open issues, it is unclear how the Application Traffic Influence is applied in the ACR procedures. Notably, such AF influence for the new EAS traffic should be done as early as possible (i.e., when the T-EAS is selected in the ACR) as part of the ACR execution phase, which can be seen as the application traffic routing preparation in the 3GPP CN for the upcoming Application Context Transfer traffic.

In this regard, embodiments disclosed herein are directed to solving the open issues as to "when to trigger" and "which entity triggers" the AF influence for the EAS traffic in the 3GPP CN in all 5 end to end ACR scenarios described in TS 23.558. The present disclosure also specifies detailed information needed to trigger the said AF influence between the EEC and EES.

Certain embodiments may provide one or more of the following technical advantage(s). Specifically, embodiments disclosed herein provide solutions to the aforementioned open issues.

Figure 4:
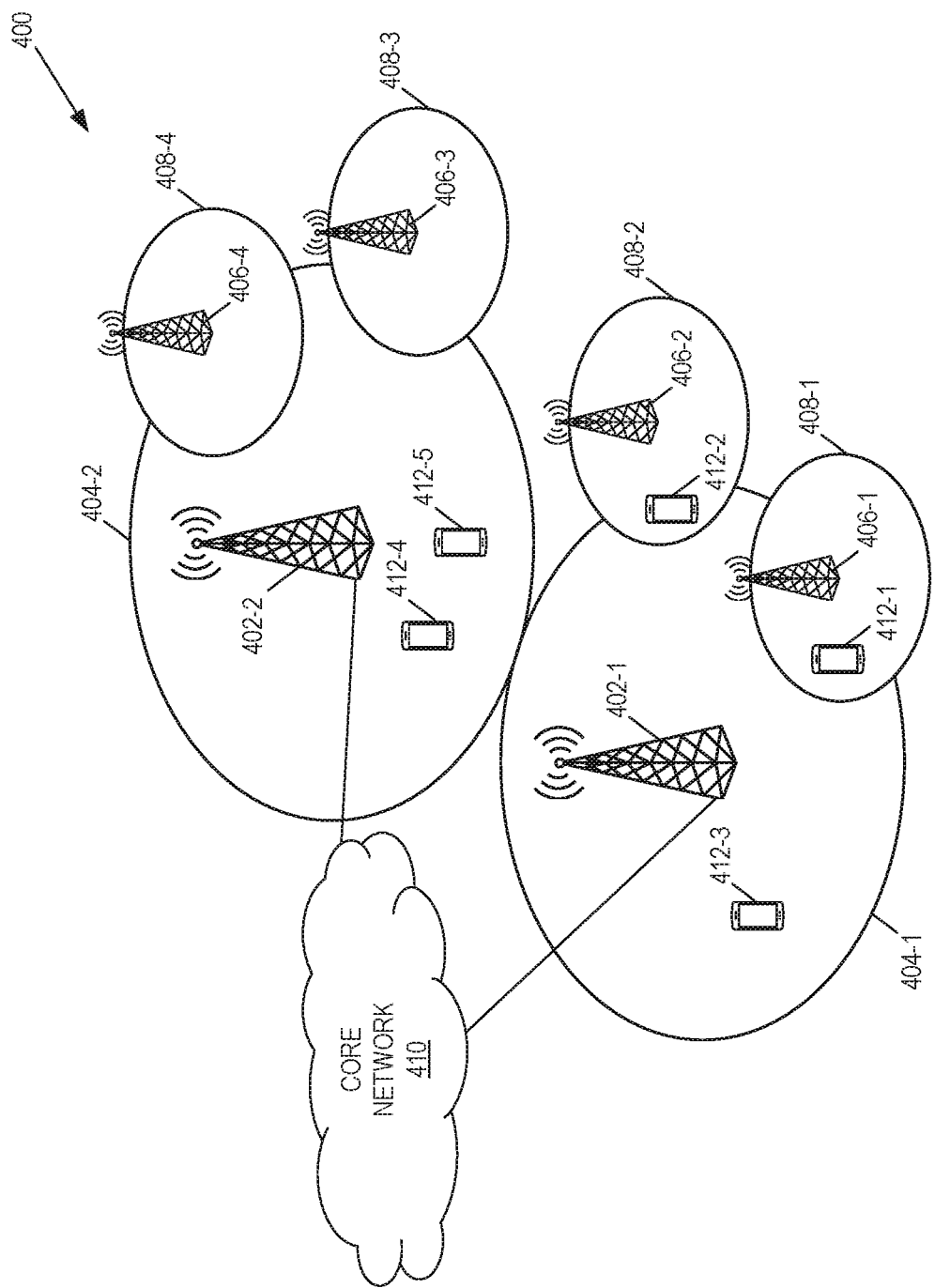
FIG. 4 illustrates one example of a cellular communications system according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC). In this example, the RAN includes base stations 402-1 and 402-2, which in the 5GS include NR base stations (gNBs) and optionally next generation eNBs (ng-eNBs) (e.g., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
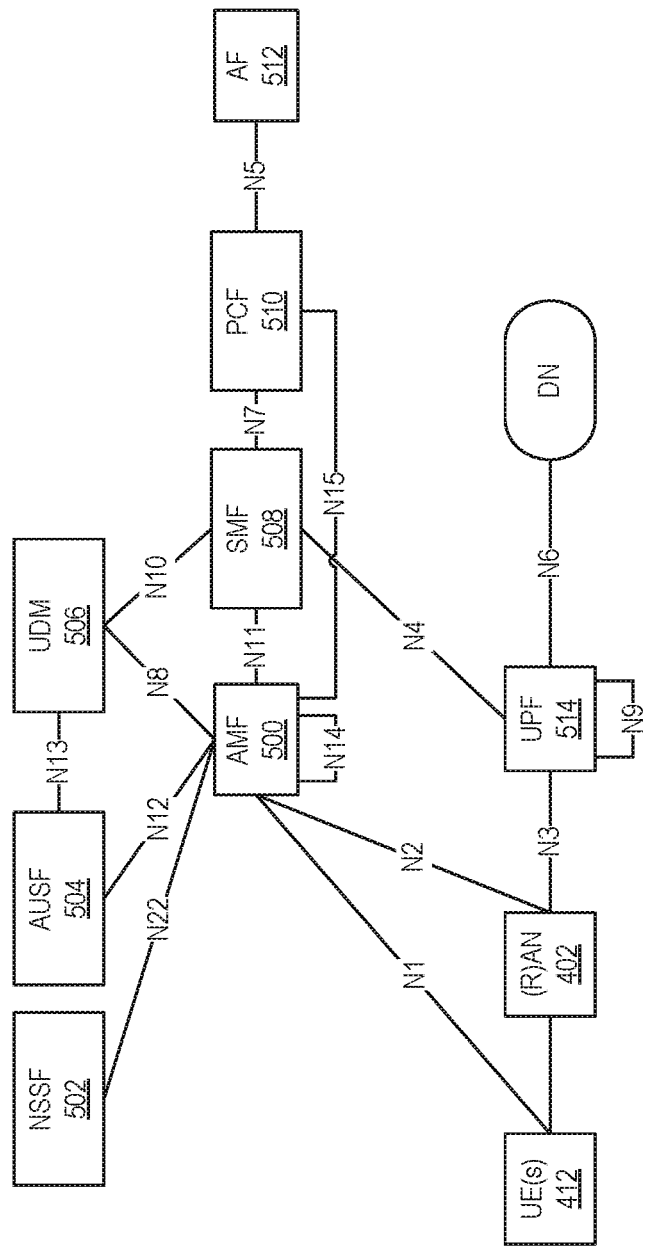
FIGS. 5 and 6 illustrate example embodiments in which the cellular communication system of FIG. 4 is a Fifth Generation (5G) System (5GS)

FIG. 5 illustrates a wireless communication system represented as a 5G network architecture composed of core Network Functions (NFs), where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of UEs 412 connected to either a RAN 402 or an Access Network (AN) as well as an AMF 500. Typically, the R(AN) 402 comprises base stations, e.g., such as eNBs or gNBs or similar. Seen from the core network side, the 5GC NFs shown in FIG. 5 include a NSSF 502, an AUSF 504, a UDM 506, the AMF 500, a SMF 508, a PCF 510, and an Application Function (AF) 512.

Reference point representations of the 5G network architecture are used to develop detailed call flows in the normative standardization. The N1 reference point is defined to carry signaling between the UE 412 and AMF 500. The reference points for connecting between the AN 402 and AMF 500 and between the AN 402 and UPF 514 are defined as N2 and N3, respectively. There is a reference point, N11, between the AMF 500 and SMF 508, which implies that the SMF 508 is at least partly controlled by the AMF 500. N4 is used by the SMF 508 and UPF 514 so that the UPF 514 can be set using the control signal generated by the SMF 508, and the UPF 514 can report its state to the SMF 508. N9 is the reference point for the connection between different UPFs 514, and N14 is the reference point connecting between different AMFs 500, respectively. N15 and N7 are defined since the PCF 510 applies policy to the AMF 500 and SMF 508, respectively. N12 is required for the AMF 500 to perform authentication of the UE 412. N8 and N10 are defined because the subscription data of the UE 412 is required for the AMF 500 and SMF 508.

The 5GC network aims at separating UP and CP. The UP carries user traffic while the CP carries signaling in the network. In FIG. 5, the UPF 514 is in the UP and all other NFs, i.e., the AMF 500, SMF 508, PCF 510, AF 512, NSSF 502, AUSF 504, and UDM 506, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 500 and SMF 508 are independent functions in the CP. Separated AMF 500 and SMF 508 allow independent evolution and scaling. Other CP functions like the PCF 510 and AUSF 504 can be separated as shown in FIG. 5. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 6:
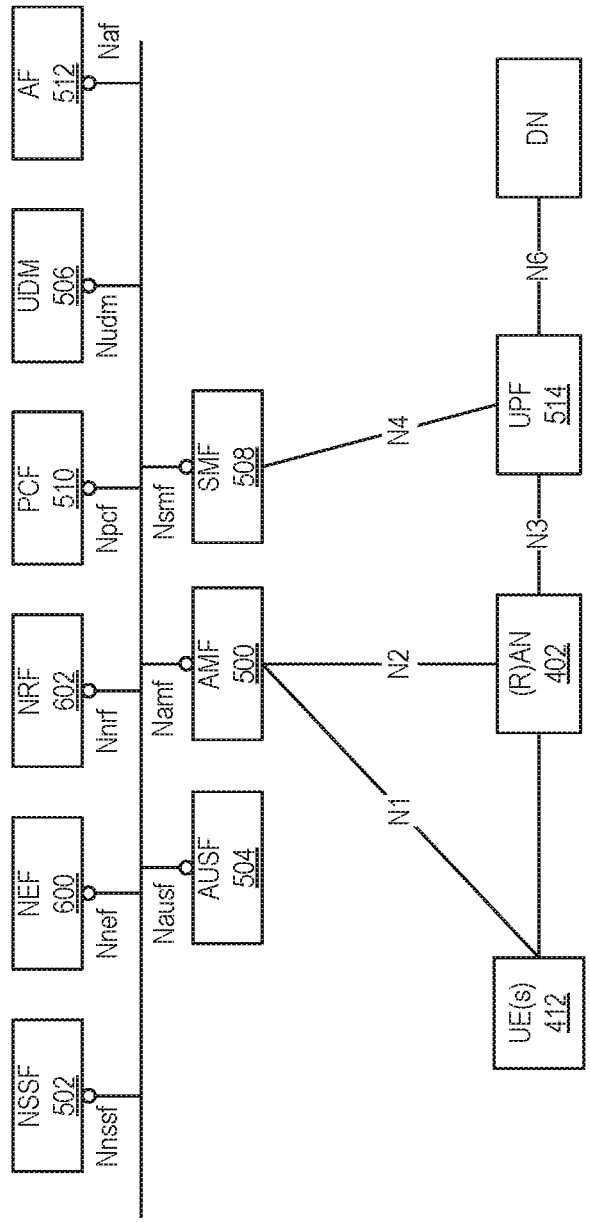

FIG. 6 illustrates a 5G network architecture using service-based interfaces between the NFs in the CP, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF 500 and Nsmf for the service based interface of the SMF 508, etc. The NEF 600 and the NRF 602 in FIG. 6 are not shown in FIG. 5 discussed above. However, it should be clarified that all NFs depicted in FIG. 5 can interact with the NEF 600 and the NRF 602 of FIG. 6 as necessary, though not explicitly indicated in FIG. 5.

Some properties of the NFs shown in FIGS. 5 and 6 may be described in the following manner. The AMF 500 provides UE-based authentication, authorization, mobility management, etc. A UE 412 even using multiple access technologies is basically connected to a single AMF 500 because the AMF 500 is independent of the access technologies. The SMF 508 is responsible for session management and allocates Internet Protocol (IP) addresses to UEs. It also selects and controls the UPF 514 for data transfer. If a UE 412 has multiple sessions, different SMFs 508 may be allocated to each session to manage them individually and possibly provide different functionalities per session. The AF 512 provides information on the packet flow to the PCF 510 responsible for policy control in order to support QoS. Based on the information, the PCF 510 determines policies about mobility and session management to make the AMF 500 and SMF 508 operate properly. The AUSF 504 supports authentication function for UEs or similar and thus stores data for authentication of UEs or similar while the UDM 506 stores subscription data of the UE 412. The Data Network (DN), not part of the network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 7:
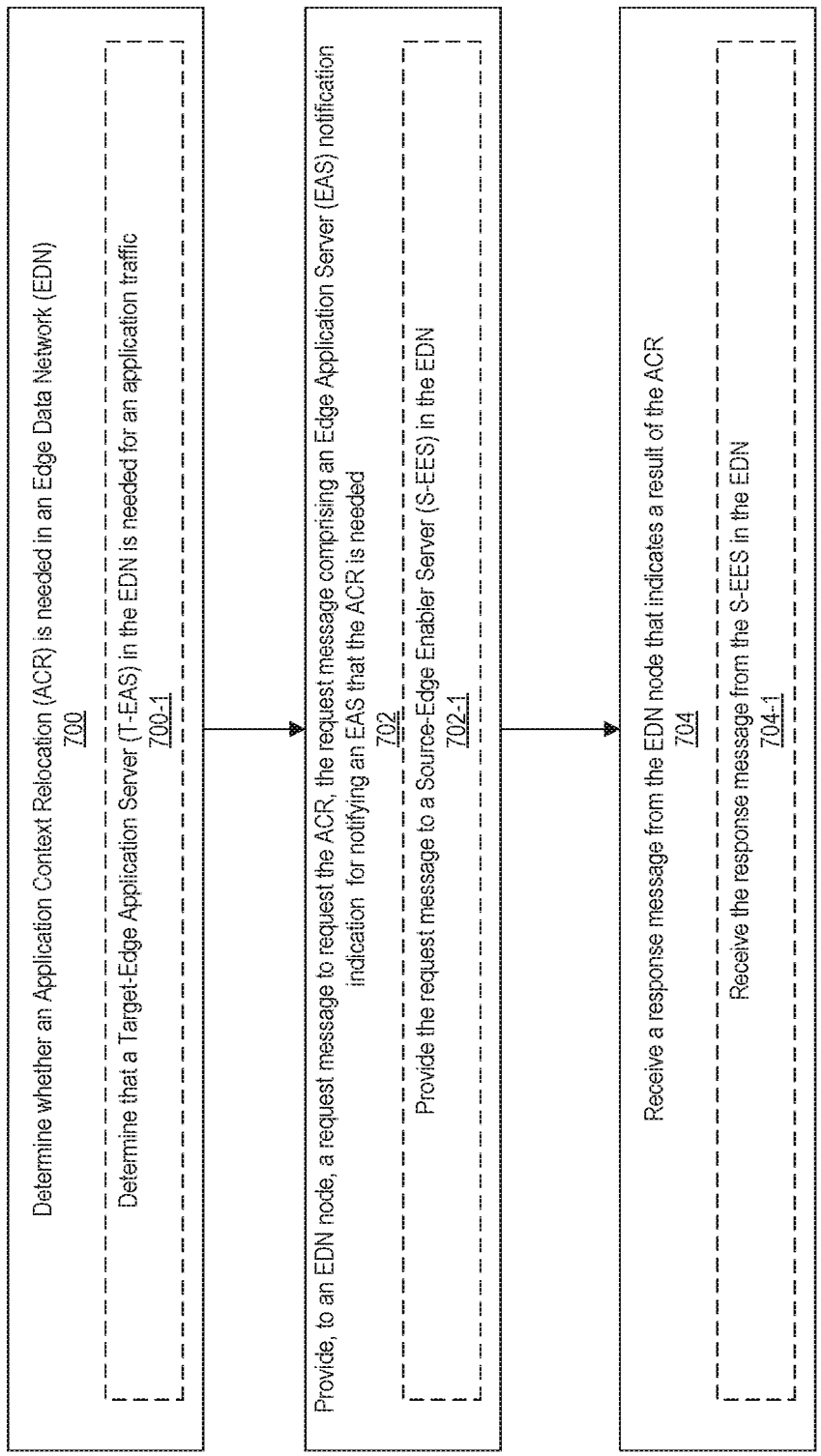
FIG. 7 is a flowchart of an exemplary method performed by a User Equipment (UE) for enabling Application Context Relocation (ACR) according to embodiments of the present disclosure.
Figure 8:
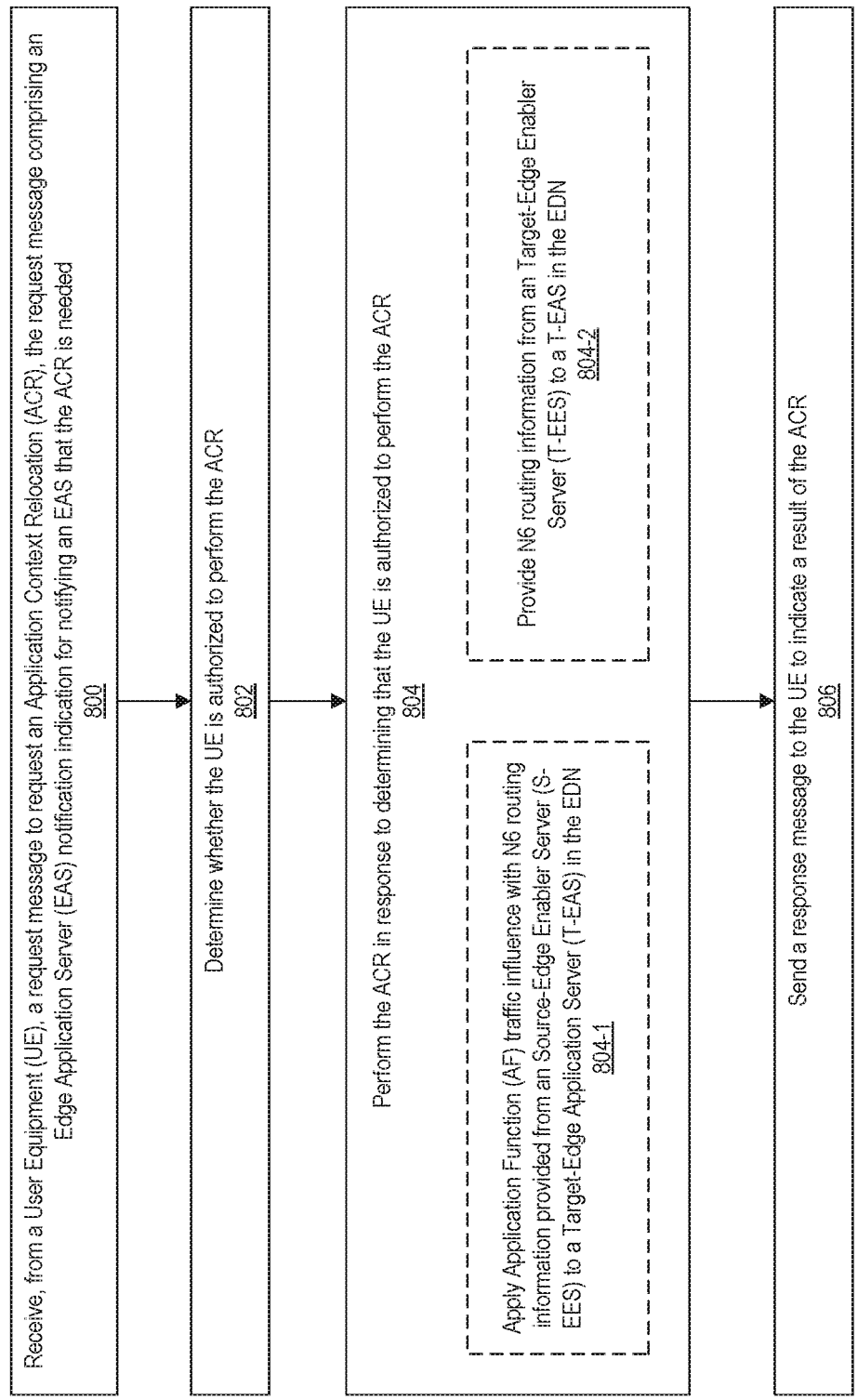
FIG. 8 is a flowchart of an exemplary method performed by an Edge Data Network (EDN) node in an EDN for enabling ACR according to embodiments of the present disclosure.

Before describing exemplary embodiments of the present disclosure, a high-level overview of methods performed by an EDN (e.g., Source-Edge Enabler Server (S-EES), Source-Edge Application Server (S-EAS)) and a UE (e.g., Edge Enabler Client (EEC), Application Clients (ACs)) for enabling Application Context Relocation (ACR) are first provided with reference to FIGS. 7 and 8.

FIG. 7 is a flowchart of an exemplary method performed by a UE for enabling ACR according to embodiments of the present disclosure. The UE is configured to determine whether an ACR is needed in an EDN (step 700). In an embodiment, the UE can determine that ACR is needed in response to determining that a Target-EAS (T-EAS) in the EDN is needed for an application traffic (step 700-1).

The UE is configured to provide, to an EDN node, a request message to request the ACR. The request message includes an EAS notification indication to request the ACR for notifying an EAS that the ACR is needed (step 702). In an embodiment, the UE can provide the request message to a S-EES in the EDN (step 702-1).

The UE is configured to receive a response message from the EDN node that indicates a result of the ACR (step 704). In an embodiment, the UE can receive the response message from the S-EES in the EDN (step 704-1).

FIG. 8 is a flowchart of an exemplary method performed by an EDN node in an EDN for enabling ACR according to embodiments of the present disclosure. The EDN node is configured to receive, from a UE, a request message to request the ACR. The request message includes an EAS notification indication for notifying an EAS that an ACR is needed (step 800). The EDN node can determine whether the UE is authorized to perform the ACR (step 802). The network node performs the ACR in response to determining that the UE is authorized to perform the ACR (step 804). In an embodiment, the EDN node can apply AF traffic influence with N6 routing information provided from an S-EES to a T-EAS in the EDN (step 804-1). In an embodiment, the EDN node can provide N6 routing information from a T-EES to a T-EAS in the EDN (step 804-2). The network node can send a response message to the UE to indicate a result of the ACR (step 806).

Figure 9:
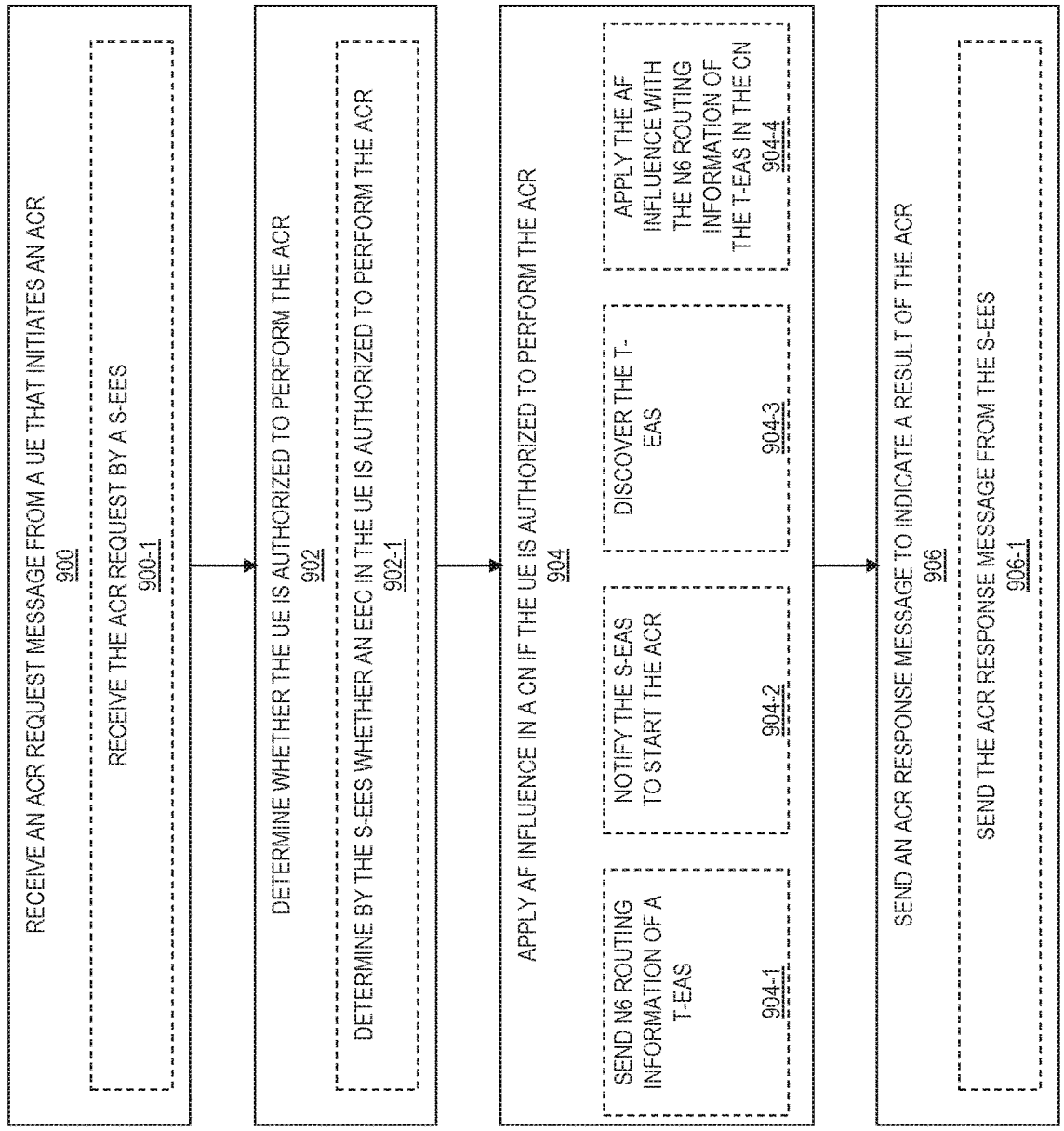
FIG. 9 is a flowchart of a method performed by an EDN for enabling ACR.

FIG. 9 is a flowchart of an exemplary method performed by an EDN for enabling an ACR. The EDN receives an ACR request message from a UE (e.g., ACs, EEC) that initiates an ACR (step 900). The ACR request message comprises one or more of a UE ID, a T-EAS, a DNAI of the T-EAS, and an EAS notification indication. In a non-limiting example, the ACR request message can be received by an S-EES in the EDN (step 900-1). The EDN then determines whether the UE is authorized to perform the ACR (step 902). In a non-limiting example, the S-EES in the EDN determines whether the EEC in the UE is authorized to perform the ACR (step 902-1). Next, the EDN applies AF influence in a CN in response to determining that the UE is authorized to perform the ACR (step 904). Specifically, step 904 may include the S-EES sending N6 routing information of a T-EAS in the CN (step 904-1), the S-EES notifying the S-EAS to start the ACR if the ACR request message includes the EAS notification indication (step 904-2), a T-EES discovering the T-EAS (step 904-3), and the T-EES applying the AF influence with the N6 routing information of the T-EAS in the CN (step 904-4). In a non-limiting example, the N6 routing information is described in table 5.6.7-1 of TS 23.501, which includes the DNAI and corresponding routing information (e.g., IP address and port number). The T-EAS endpoint sent in the ACR request may include the routing information (IP address and port number). In this regard, the S-EES may apply the AF influence by sending N6 routing information of the T-EAS in the CN. Accordingly, the EDN can send an ACR response message to the UE to indicate a result of the ACR (step 906). In a non-limiting example, the ACR response message can be sent by the S-EES in the EDN (step 906-1).

Figure 10:
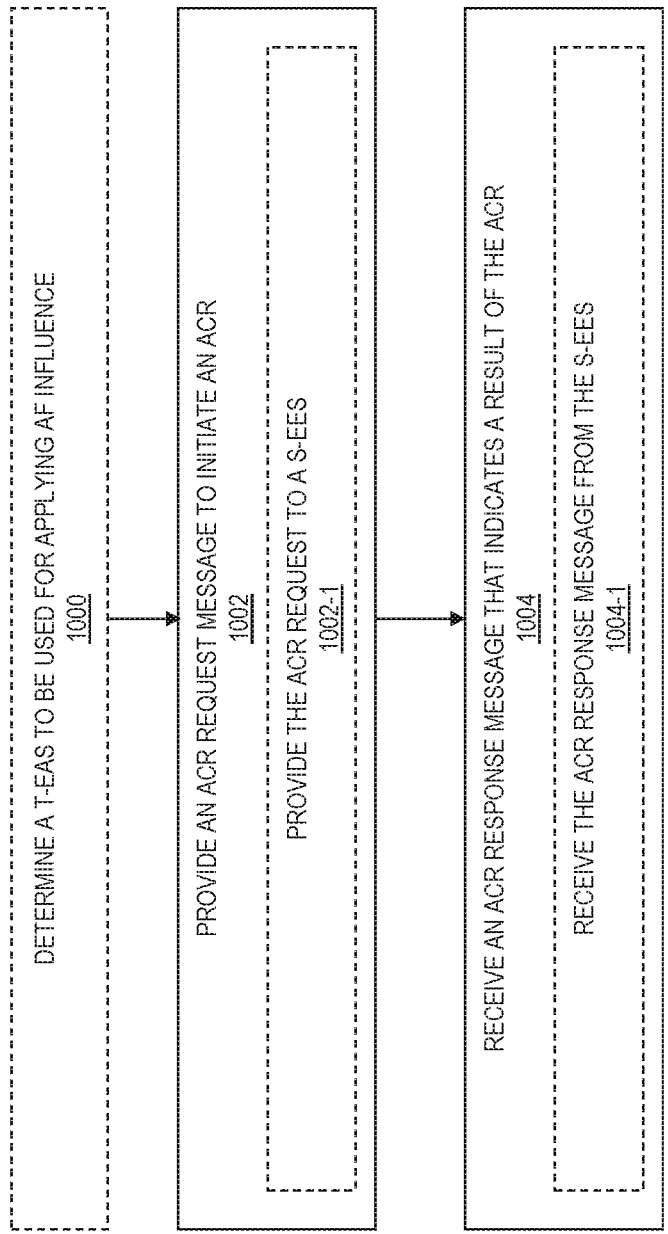
FIG. 10 is a flowchart of a method performed by a UE for enabling ACR.

FIG. 10 is a flowchart of an exemplary method performed by a UE for enabling ACR. An EEC in the UE may be configured to first determine a T-EAS in the EDN to be used for applying AF influence (step 1000). The UE provides an ACR request message to initiate an ACR (step 1002). The ACR request message comprises one or more of a UE ID, a Target EAS, T-EAS, a DNAI of the T-EAS, and an EAS notification indication. In a non-limiting example, the UE can send the ACR request message to an S-EES in the EDN (step 1002-1). Accordingly, the UE can receive an ACR response message from the EDN that indicates a result of the ACR (step 1004). In a non-limiting example, the UE can receive the ACR response message from the S-EES in the EDN (step 1004-1).

Figure 11:
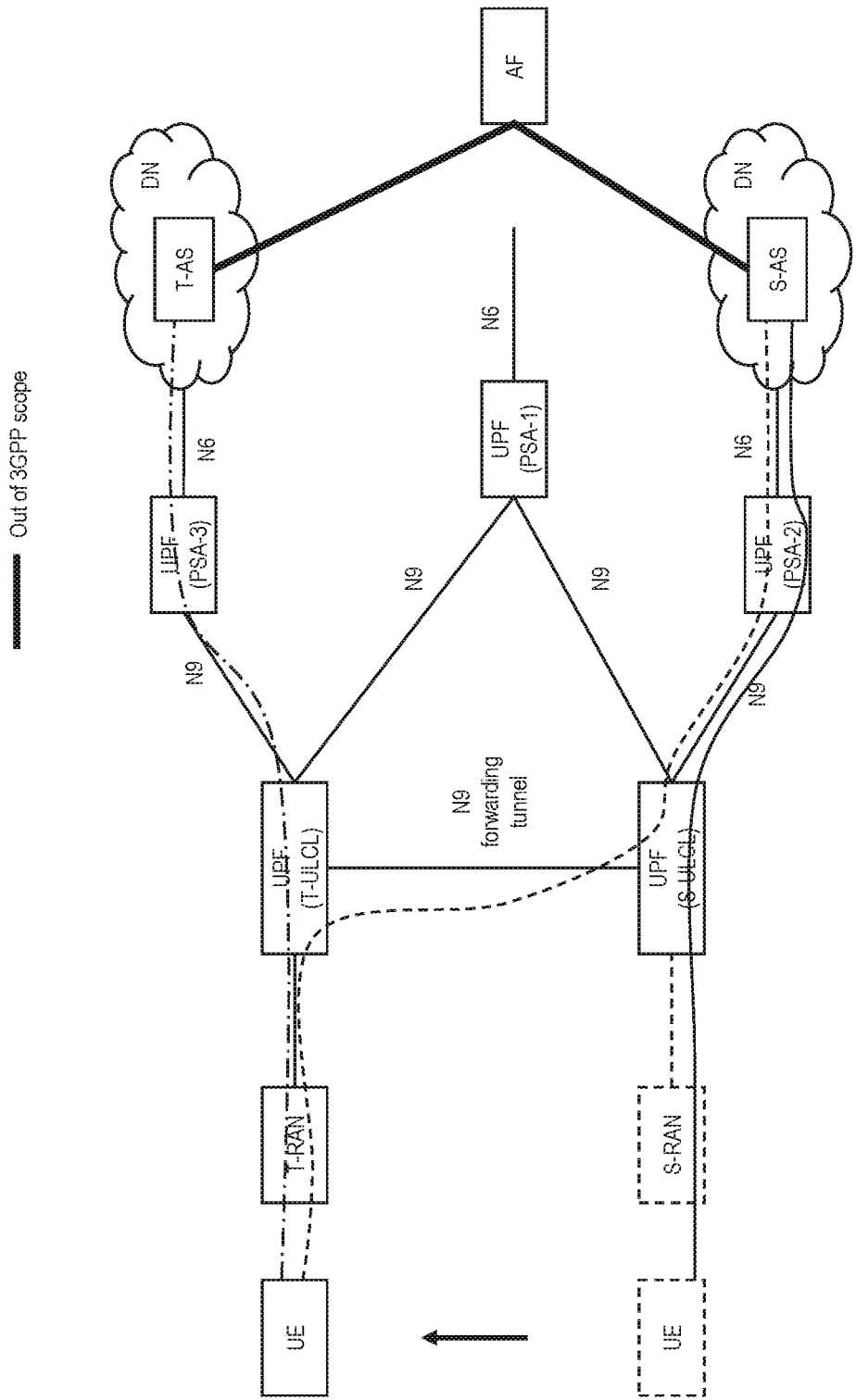
FIG. 11 illustrates an architecture with an N9 forwarding tunnel between a source and target Uplink Classifier (ULCL)

With respect to "when to trigger" the AF influence for the EAS traffic in the 3GPP CN prior to providing the ACR request message to initiate an ACR in step 802, FIG. 11 illustrates an architecture with an N9 forwarding tunnel between a source and target Uplink Classifier (ULCL). Among the traffic paths depicted in FIG. 9, the solid line extending from the UE (on the bottom) to the Source Application Server (S-AS) represents the application traffic in the old location between the UE and the S-AS. After the UE moves to another location, the dashed line extending from the UE (on the top) to the S-AS (also referred to as a "lower dashed line") represents the application traffic in the new location between UE and S-AS and the dashed line extending from the UE (on the top) to the Target Application Server (T-AS) (also referred to as an "upper dashed line") represents the application traffic in the new location between UE and T-AS. The 3GPP CN User Plane (UP) needs to be configured properly by the AF so that the traffic routing can be optimized.

TS 23.501 clause 5.6.7.2 states that "before the UP path toward the new DNAI is activated, application traffic data (if any exists) is still routed toward the old DNAI."

If, for instance, the AF does not configure the traffic steering in time for the traffic between the UE and the T-AS during application context relocation, the application traffic that should be routed from the UE toward the T-AS along the upper dashed line may instead be routed along the lower dashed line via UPF (T-ULCL)→UPF (S-ULCL)→UPF (PSA2) to the DN. As a result, some non-routable packet may be routed toward the T-AS and consequently the application context transfer may not be performed accordingly.

TS 23.502, clause 4.3.6.3 describes the handling of 3GPP UP management event notification, which is illustrated in FIG. 10.

Figure 12:
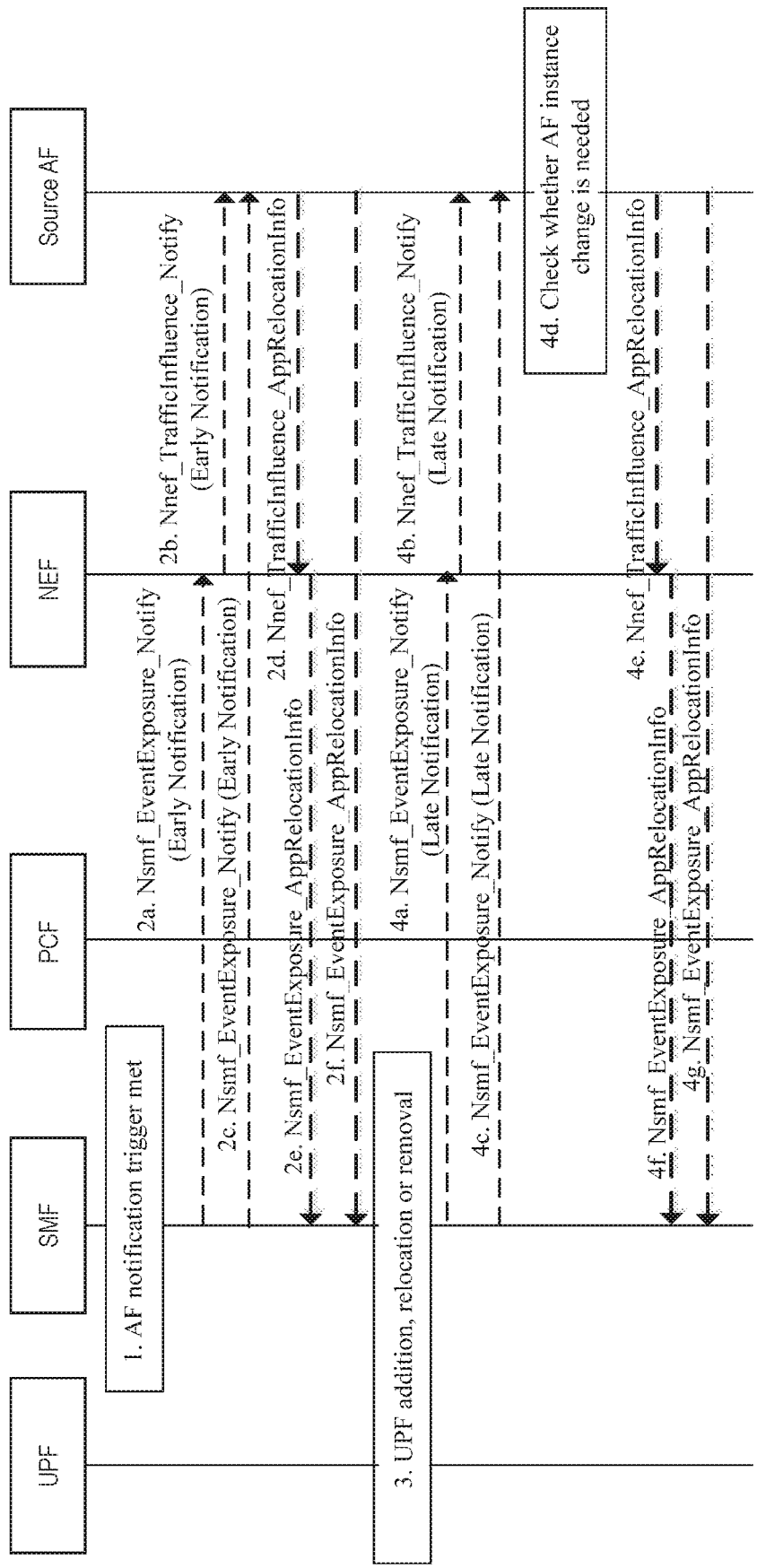
FIG. 12 illustrates notification of a User Plane (UP) management event.

In FIG. 12, step 4d, the Source Application Function (S-AF) checks whether AF instance change is needed then provides Network Exposure Function (NEF)/Session Management Function (SMF) with new traffic influence information (i.e., target DNAI and N6 routing info) such that a "gate" in the designated UPF is opened for handling the application traffic.

According to SA6 specified application architecture, step 4d can be further broken into the following steps:

S-EAS receives UP path change event (either directly from 3GPP CN or via EES User Plane Path Management API) and performs the T-EAS discovery procedure as specified in TS 23.558, clause 8.8.2; or S-EES receives UP path change from 3GPP CN and performs the T-EAS discovery procedure involving ECS and other EES(es) on behalf of S-EAS.

There are two considerations to have the traffic influence before Application Context Transfer:

Even though the Application Context Transfer details are out of 3GPP scope, it may need AC involvement in the Application Context Transfer coordination (e.g., see TR 23.748 solution #51), and the UP routing for the traffic towards the T-EAS shall be steered in the right timing.

For the Network side executed ACR, the UP path change notification may be used as the trigger for ACR, according to the explanation in FIG. 10, the traffic steering is done as soon as the new AF instance is selected. If context migration is included in step 4d, it may be time consuming to move the context from the S-EAS to the T-EAS which delays the sending of Nnef_TrafficInfluence_AppRelocationInfo in step 4e or Nsmf_EventExposure_AppRelocationInfo in step 4g, and consequently the timer in the SMF expires before SMF receives Nsmf_EventExposure_AppRelocationInfo as specified in TS 23.501, clause 5.6.7.2.

Figure 13:
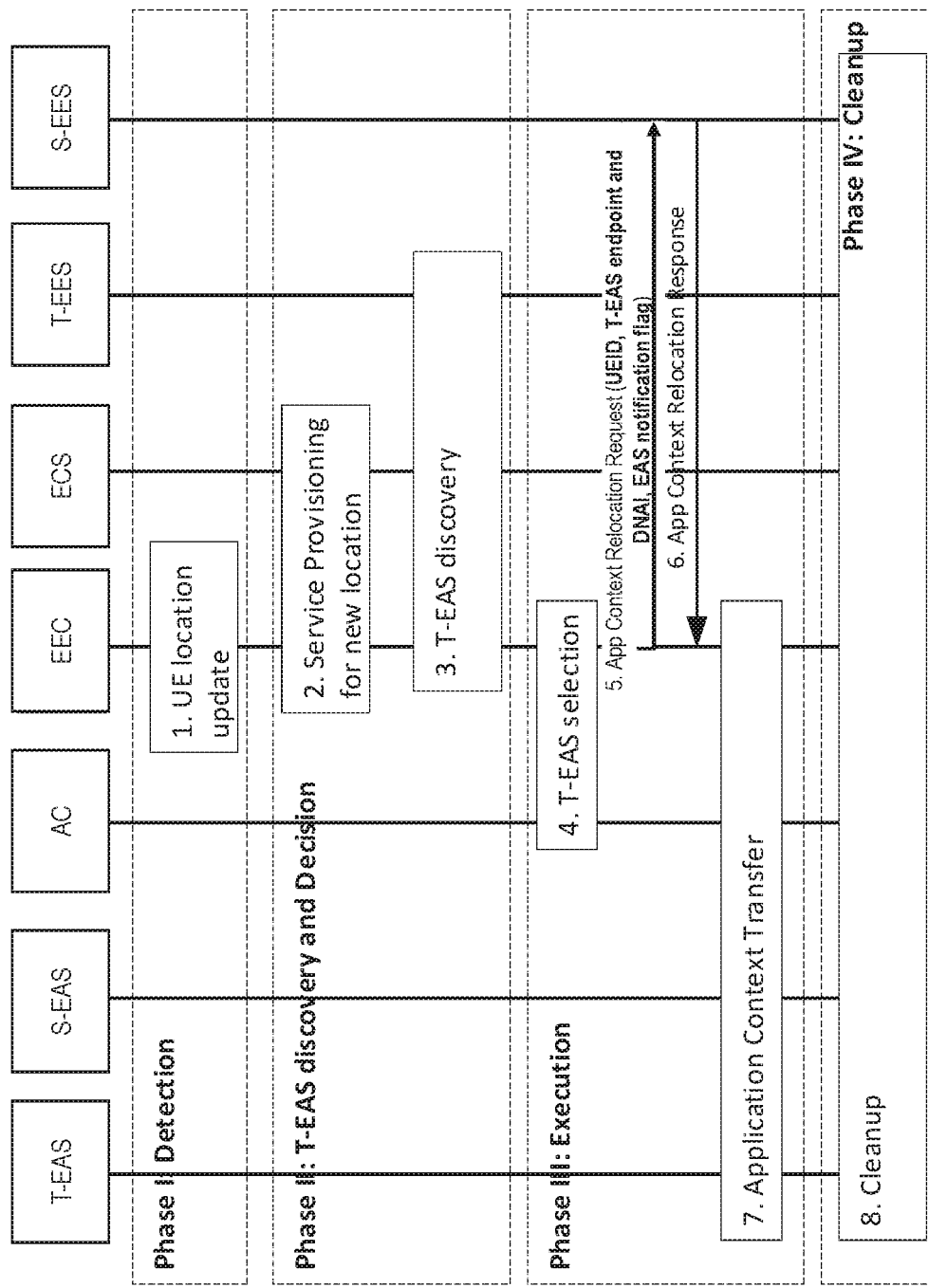
FIG. 13 illustrates ACR initiated by EEC and ACs in a UE.

FIG. 13 illustrates ACR initiated by EEC and ACs. In step 5 of FIG. 11, after UE (AC and EEC) determines the T-EAS to be used (e.g., step 700-1), the EEC shall send ACR Request with UE ID, T-EAS endpoint and DNAI, EAS notification flag (false) to the S-EES (e.g., steps 702, 800). The S-EES applies traffic influence in the 3GPP CN based on the received information (e.g., step 804-1).

Figure 14:
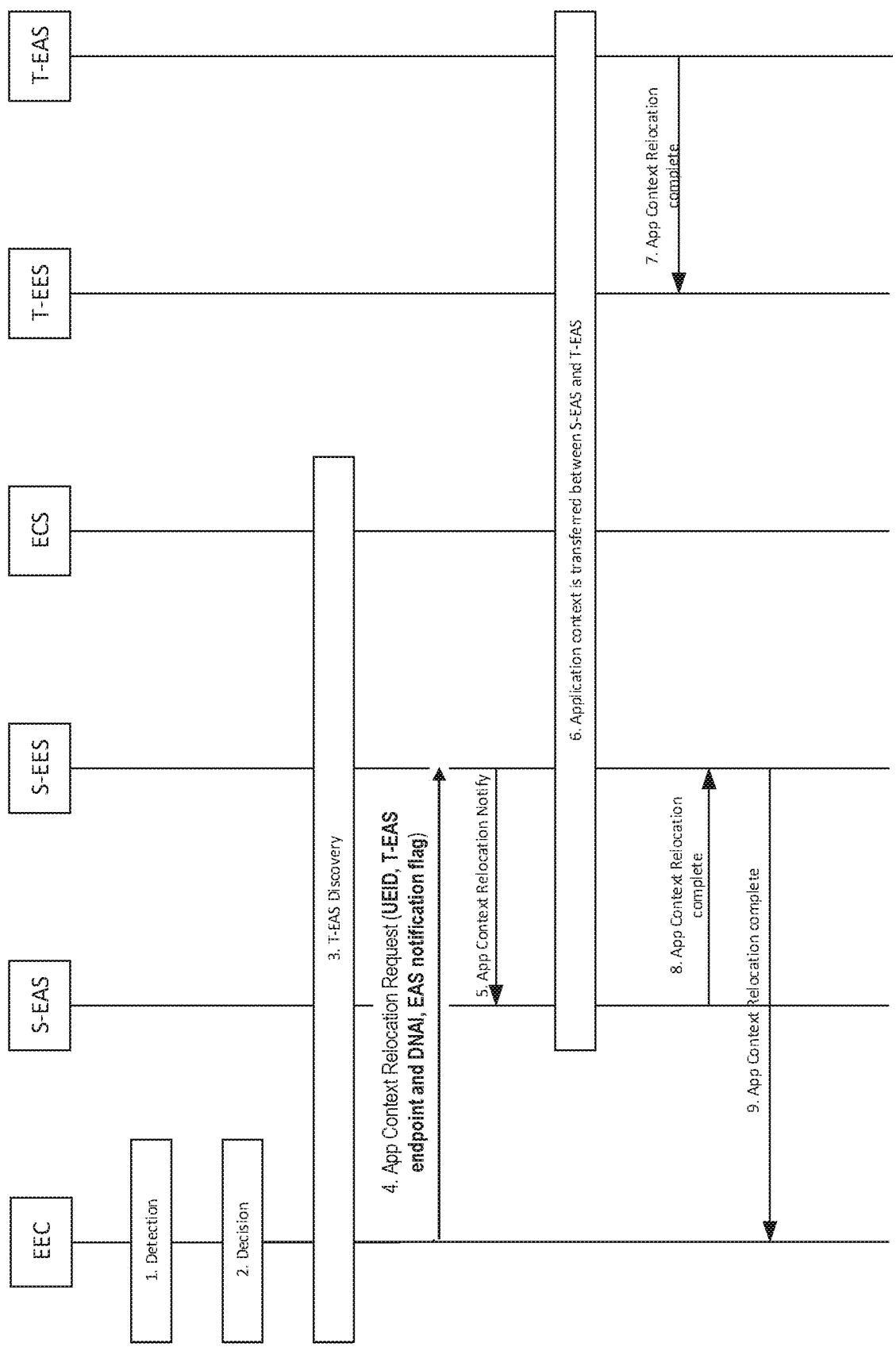
FIG. 14 illustrates an ACR procedure executed by the EEC in FIG. 11.

FIG. 14 illustrates EEC executed ACR procedure. In step 4 of FIG. 12, after UE (AC and EEC) determines the T-EAS to be used, the EEC shall send ACR Request with UE ID, T-EAS endpoint and DNAI, EAS notification flag (true) to the S-EES (e.g., steps 702, 800). The S-EES applies traffic influence in the 3GPP CN based on the received information and notifies the S-EAS in step 5. In addition, the EEC may also send the ACR Request to the T-EES to influence application traffic (e.g., step 804-2).

Figure 15:
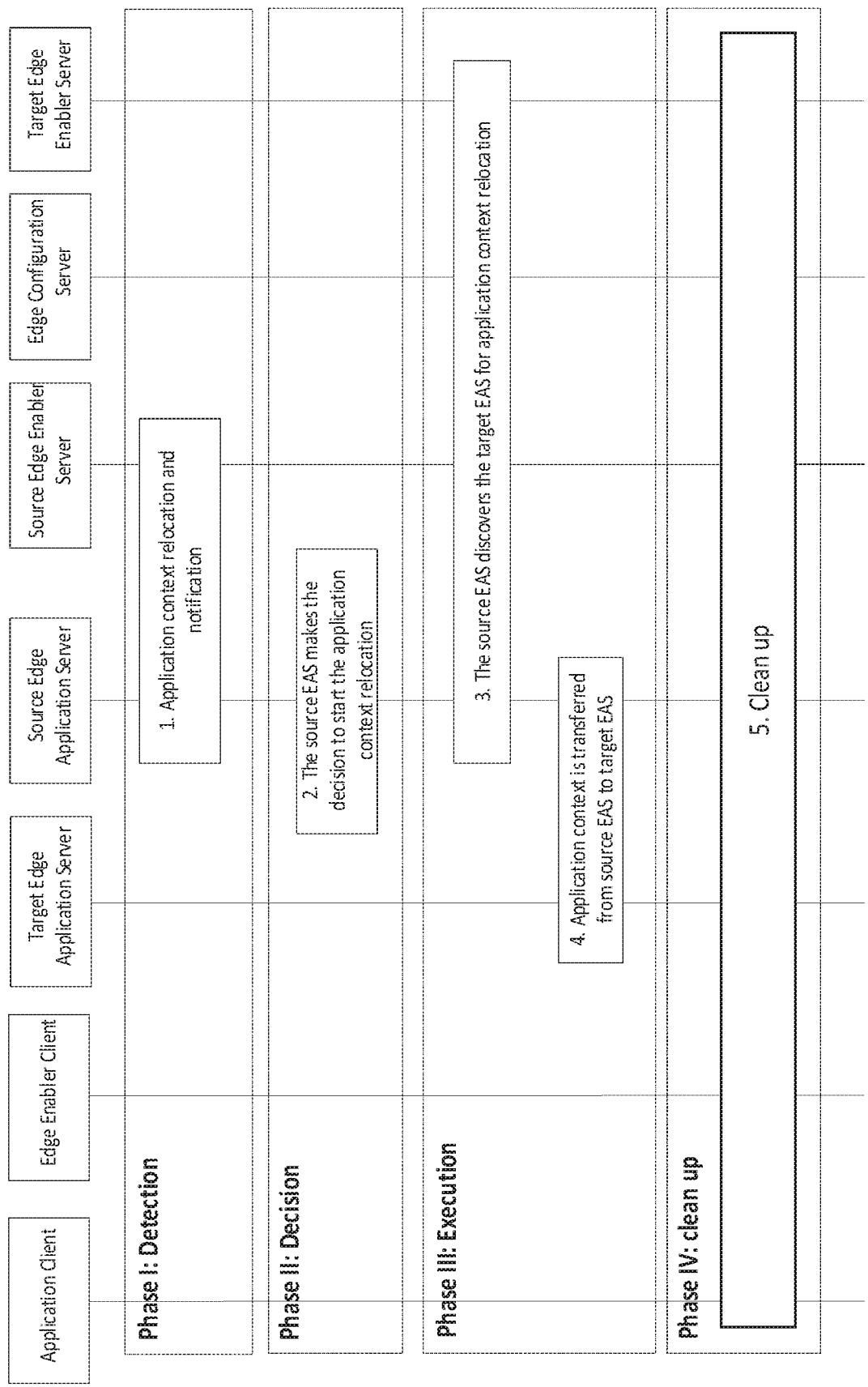
FIG. 15 illustrates an ACR procedure initiated by a Source Edge Application Server (S-EAS) in an EDN.
Figure 16:
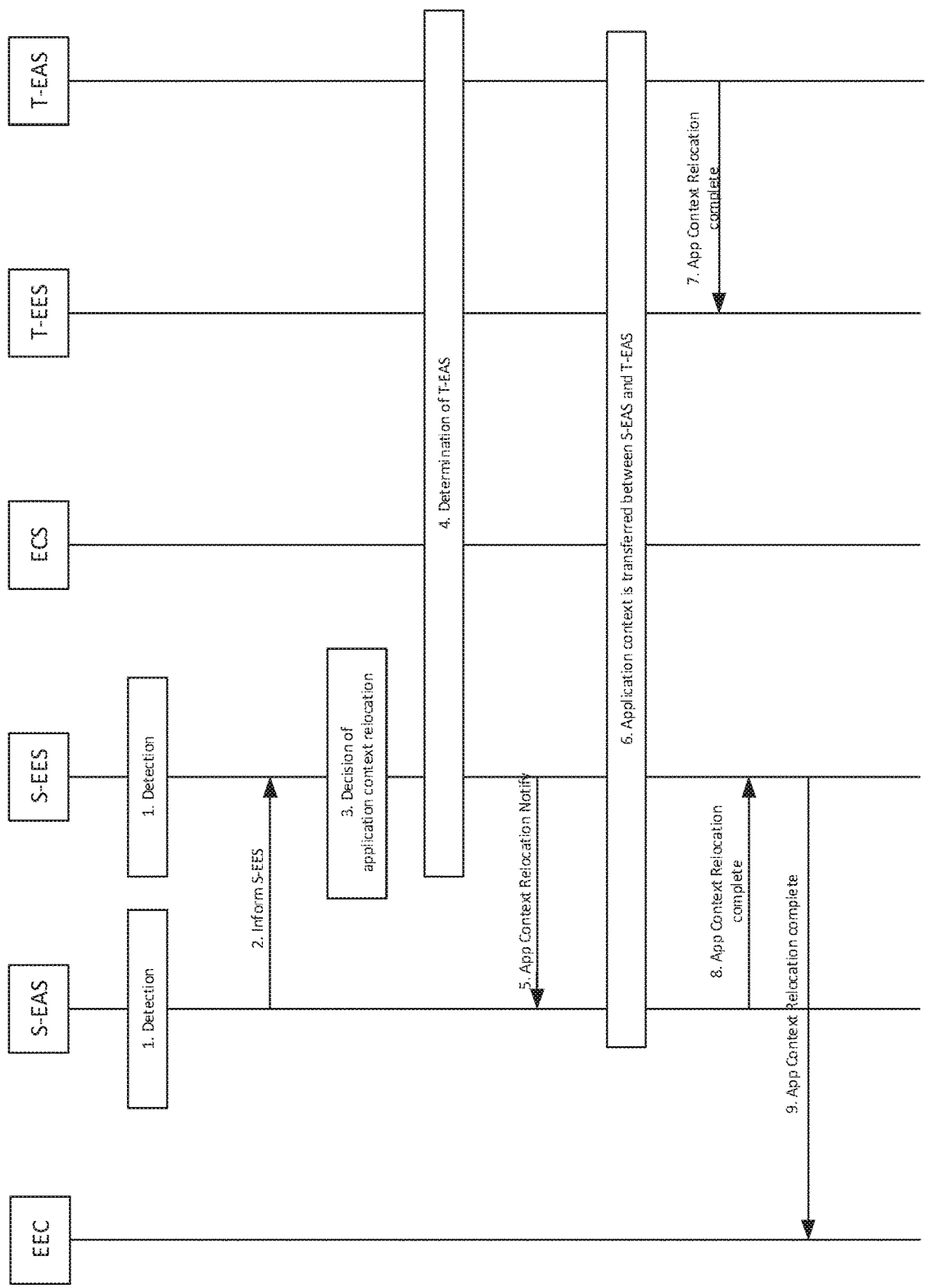
FIG. 16 illustrates an ACR procedure executed by a Source Edge Enabler Server (S-EES) in the EDN of FIG. 13.
Figure 17:
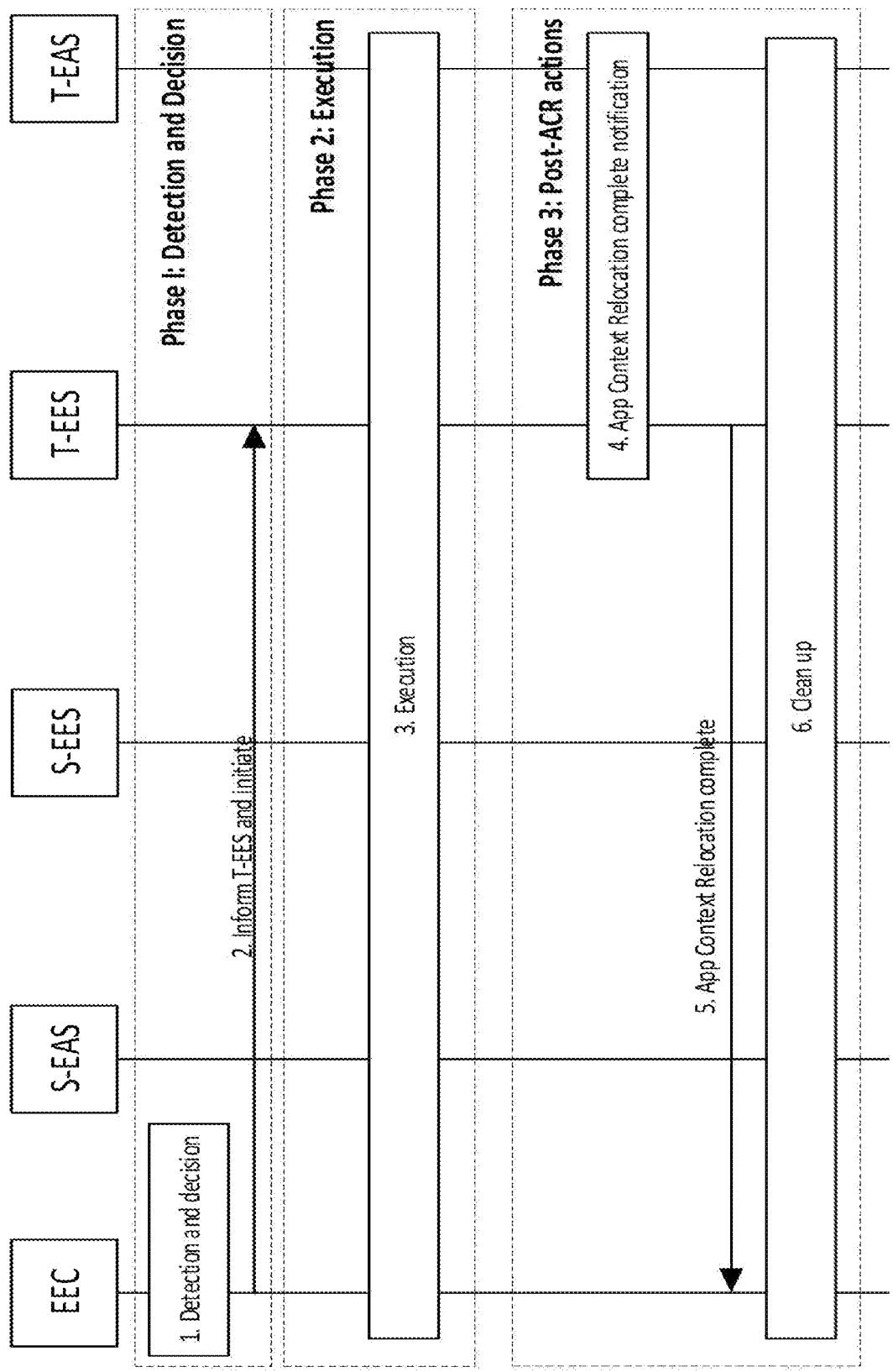
FIG. 17 illustrates an ACR procedure executed by a Target EES (T-EES) in the EDN of FIG. 13.

Notably, FIGS. 13 and 14 are related to UE initiated ACR procedures. It should be appreciated that ACR procedures can also be initiated by EDN (e.g., S-EAS, S-EES, or T-EES). In this regard, FIGS. 15-17 illustrate S-EAS initiated ACR scenario, S-EES executed ACR procedure, and T-EES executed ACR procedure, respectively. More detail related to the ACR procedures illustrated in FIGS. 15-17 can be found in the 3GPP CR as enclosed below.

Figure 18:
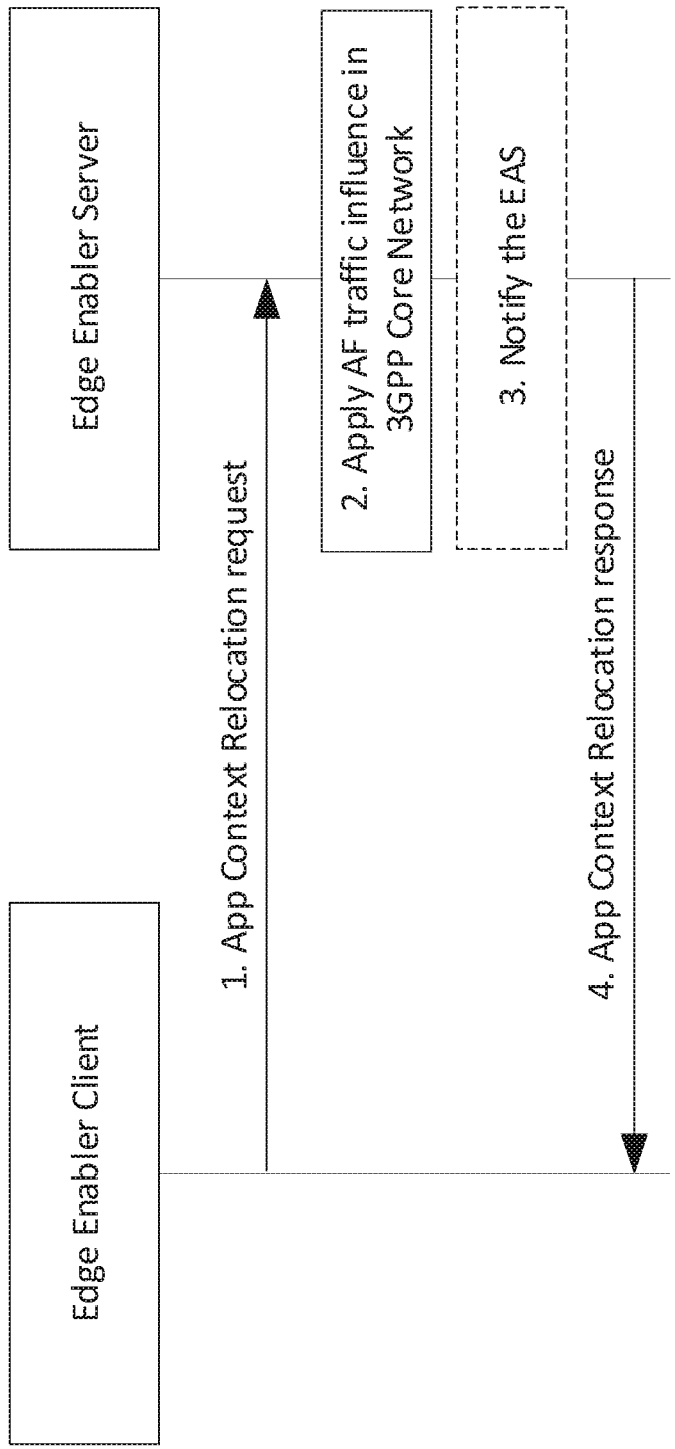
FIG. 18 illustrates an ACR procedure that is applicable to the ACR scenarios illustrated in FIGS. 13-17.

FIG. 18 illustrates an ACR procedure that is applicable to both UE initiated and EDN initiated ACR procedures. The ACR procedure depicted in FIG. 16 includes the following aspects:

1. The EEC sends an ACR request message (UE identity, target EAS endpoint, DNAI of the target EAS, EAS notification indication) to the EES in order to start ACR (e.g., influence the application traffic, notify the EAS). Notably, this step may be equivalent to step 702 in FIG. 7.
2. The EES checks whether the EEC is authorized for this operation for the UE (e.g., step 802). If authorized, then the EES applies the AF traffic influence with the N6 routing information of the T-EAS in the 3GPP CN. Notably, these steps may be equivalent to step 804-1 in FIG. 8.
3. If the EAS notification indication is set in step 1 and the EAS has subscribed to receive such notification, the EES shall notify the EAS about the need to start ACR. Notably, this step may be equivalent to step 804-2 in FIG. 8.
4. The EES responds to the EEC's request with an ACR response message (result) to the EEC. Notably, this step may be equivalent to step 806 in FIG. 8.

Figure 19:
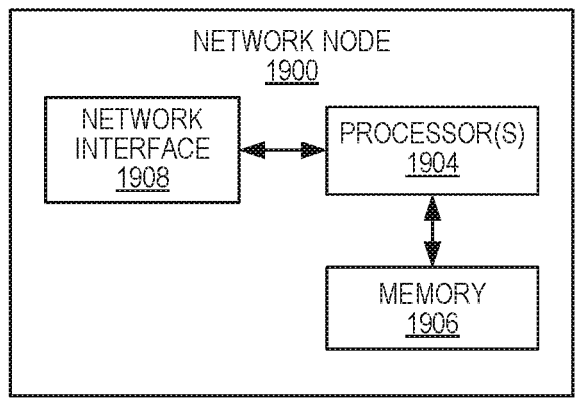
FIG. 19 is a schematic block diagram of a network node according to some embodiments of the present disclosure.

FIG. 19 is a schematic block diagram of a network node 1900 according to some embodiments of the present disclosure. The network node 1900 may be, for example, a core network node (e.g., S-EES, T-EES, S-EAS, T-EAS). As illustrated, the network node 1900 includes one or more processors 1904 (e.g., Central Processing Units (CPUs), Application Specific Integrated Circuits (ASICs), Field Programmable Gate Arrays (FPGAs), and/or the like), memory 1906, and a network interface 1908. The one or more processors 1904 are also referred to herein as processing circuitry. The one or more processors 1904 operate to provide one or more functions of the network node 1900 as described herein (e.g., one or more functions of S-EES, T-EES, S-EAS, and T-EAS as described herein). In some embodiments, the function(s) are implemented in software that is stored, e.g., in the memory 1906 and executed by the one or more processors 1904.

Figure 20:
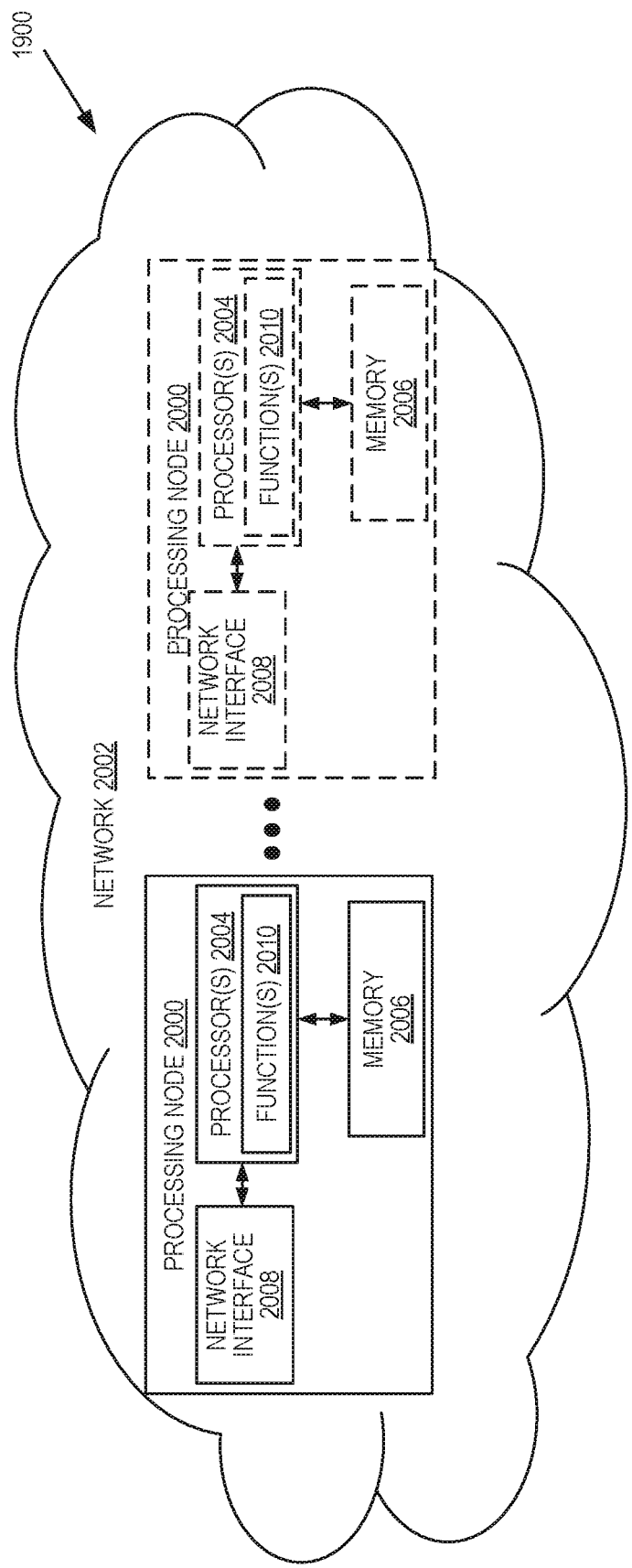
FIG. 20 is a schematic block diagram that illustrates a virtualized embodiment of the network node according to some embodiments of the present disclosure.

FIG. 20 is a schematic block diagram that illustrates a virtualized embodiment of the network node 1900 according to some embodiments of the present disclosure. Optional features are represented by dashed boxes. As used herein, a "virtualized" network node is an implementation of the network node 1900 in which at least a portion of the functionality of the network node 1900 is implemented as a virtual component(s) (e.g., via a virtual machine(s) executing on a physical processing node(s) in a network(s)). As illustrated, in this example, the network node 1900 includes one or more processing nodes 2000 coupled to or included as part of a network(s) 2002. Each processing node 2000 includes one or more processors 2004 (e.g., CPUs, ASICs, FPGAs, and/or the like), memory 2006, and a network interface 2008. In this example, functions 2010 of the network node 1900 described herein (e.g., one or more functions of S-EES, T-EES, S-EAS, and T-EAS as described herein) are implemented at the one or more processing nodes 2000 or distributed across the two or more processing nodes 2000 in any desired manner. In some particular embodiments, some or all of the functions 2010 of the network node 1900 described herein are implemented as virtual components executed by one or more virtual machines implemented in a virtual environment(s) hosted by the processing node(s) 2000.

In some embodiments, a computer program including instructions which, when executed by at least one processor, causes the at least one processor to carry out the functionality of the network node 1900 or a node (e.g., a processing node 2000) implementing one or more of the functions 2010 of the network node 1900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
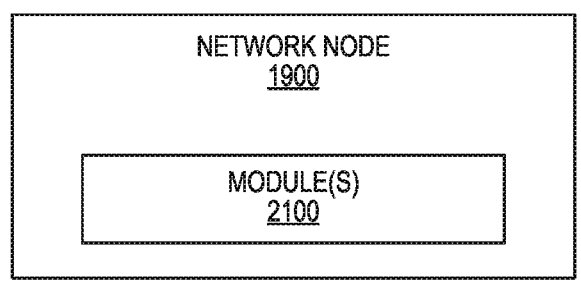
FIG. 21 is a schematic block diagram of the network node according to some other embodiments of the present disclosure.

FIG. 21 is a schematic block diagram of the network node 1900 according to some other embodiments of the present disclosure. The network node 1900 includes one or more modules 2100, each of which is implemented in software. The module(s) 2100 provide the functionality of the network node 1900 described herein. This discussion is equally applicable to the processing node 2000 of FIG. 20 where the modules 2100 may be implemented at one of the processing nodes 2000 or distributed across multiple processing nodes 2000.

Figure 22:
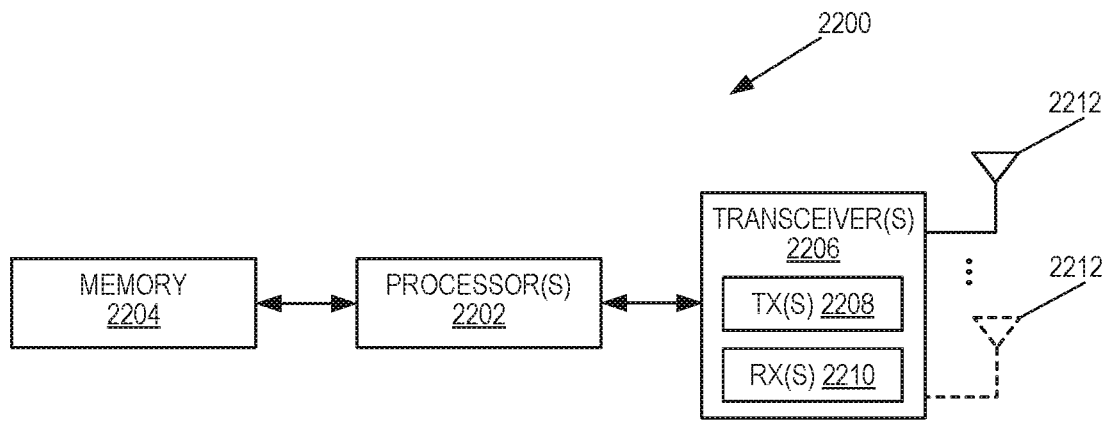
FIG. 22 is a schematic block diagram of a UE according to some embodiments of the present disclosure.

FIG. 22 is a schematic block diagram of a wireless communication device 2200 according to some embodiments of the present disclosure. As illustrated, the wireless communication device 2200 includes one or more processors 2202 (e.g., CPUs, ASICs, FPGAs, and/or the like), memory 2204, and one or more transceivers 2206 each including one or more transmitters 2208 and one or more receivers 2210 coupled to one or more antennas 2212. The transceiver(s) 2206 includes radio-front end circuitry connected to the antenna(s) 2212 that is configured to condition signals communicated between the antenna(s) 2212 and the processor(s) 2202, as will be appreciated by on of ordinary skill in the art. The processors 2202 are also referred to herein as processing circuitry. The transceivers 2206 are also referred to herein as radio circuitry. In some embodiments, the functionality of the wireless communication device 2200 described above may be fully or partially implemented in software that is, e.g., stored in the memory 2204 and executed by the processor(s) 2202. Note that the wireless communication device 2200 may include additional components not illustrated in FIG. 22 such as, e.g., one or more user interface components (e.g., an input/output interface including a display, buttons, a touch screen, a microphone, a speaker(s), and/or the like and/or any other components for allowing input of information into the wireless communication device 2200 and/or allowing output of information from the wireless communication device 2200), a power supply (e.g., a battery and associated power circuitry), etc.

In some embodiments, a computer program including instructions which, when executed by at least one processor, causes the at least one processor to carry out the functionality of the wireless communication device 2200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
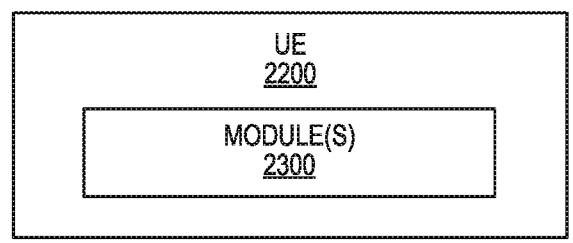
FIG. 23 is a schematic block diagram of the UE of FIG. 20 according to some other embodiments of the present disclosure.

FIG. 23 is a schematic block diagram of the wireless communication device 2200 according to some other embodiments of the present disclosure. The wireless communication device 2200 includes one or more modules 2300, each of which is implemented in software. The module(s) 2300 provide the functionality of the wireless communication device 2200 described herein.

Specific changes for one example embodiment of the present disclosure are further described in detail below as changes to 3GPP TS 23.558 v1.0.0. The changes are represented by underlined text.

Changes for 3GPP TS 23.558 v1.0.0

8.8.2.2 Initiation by Edge Enabler Client Using Regular EAS Discovery

Refer to FIG. 13 now. This procedure handles Application Context Relocation as a result of the UE moving to a new location which is outside the service area of the serving EAS. It further relies on the EEC being triggered as a result of the UE's movement.

This procedure is based on Service Provisioning (as specified in clause 8.3) and EAS Discovery (as specified in clause 8.5) procedures to discover the target EESs and EASs that shall serve the ACs as a result of the UE's new location, and that will receive the Application Context from the serving EASs.

The procedure in the following clause describes the relocation of a single application context to a new EAS. It should be repeated for each active AC in the UE.

This procedure relies on an interface between the EEC and ACs over EDGE-5, which is out of the scope of this specification.

Pre-Conditions:
1. The Application Client in the UE already has a connection to a corresponding source Edge Application Server;
2. The preconditions listed in clause 8.3.2.3 with regards to the Edge Enabler Client are fulfilled; and
3. The Edge Enabler Client is triggered when it obtains the UE's new location or is triggered by another entity such as an ECS notification.

NOTE 1: This procedure is applicable only for Edge-aware ACs and EASs.

Specific Changes:
1. The EEC is triggered as a result of a UE mobility event and provided with the UE's new location.

NOTE 2: If the EEC is triggered by an external entity such as by a notification from the ECS, a list of new EESs (that will be used as target EESs) is provided by that notification and step 2 below is skipped.

Editor's Note: Whether and how the EEC knows the UE has moved out of the EDN service area is FFS.

2. The EEC performs Service Provisioning (as specified in clause 8.3) for all active applications. Since the location of the UE has changed, this procedure results in a list of T-EESs that are relevant to the supplied applications and the new location of the UE.

NOTE 3: If the change in UE's location does not trigger a need to change the serving EAS, the subsequent steps will not take place. The EEC will remain connected to the serving EESs and the ACs will remain connected to their corresponding serving EASs.

3. Using the provisioned target EESs, the EEC performs EAS discovery (as specified in clause 8.5) for the desired target EASs by querying the target EESs that were established in step 2 (or provided in the notification from the ECS—if it was the trigger)

Editor's Note: Whether an additional IE is required to classify EAS Discovery for ACR is FFS.

4. The AC and EEC decide the target EAS to be used for the application traffic, as described in clause 8.5.1 EAS discovery.

5-6. The EEC asks the S-EES to influence the application traffic as described in clause 8.8.3.x, without indicating the need to notify the EAS.

7. The AC is triggered by the EEC to start Application Context Transfer. The AC decides to initiate the transfer of application context from the source EAS to the target EAS. There may be different ways of transferring context and they are all outside the scope of this specification. After the application context relocation is completed, the AC remains connected to the target EAS and disconnects from the source EAS; the EEC is informed of the completion.

NOTE 4: Whether and how the AC initiates the application context transfer is out of scope of the present document.

5. All required entities perform clean-up.

Editor's note: Evaluate the need of an appropriate step for supporting EEC context transfer from S-EES(s) to T-EES(s).

8.8.2.3 EEC Executed Application Context Relocation

FIG. 14 illustrates the procedure for the EEC to execute the application context relocation from the S-EAS to the T-EAS.

Pre-Condition:
1. The AC at the UE already has a connection to the S-EAS; and
2. The EEC is able to communicate with the S-EES.

Specific Changes:
1. The EEC detects that application context relocation may be required.

Editor's Note: Details of detection event including what events the EEC detects is FFS.

2. The EEC decides to proceed required procedures for triggering application context relocation.

Editor's Note: Gathering consent from other EDGEAPP entities is FFS.

3. The EEC determines the T-EES by using the provisioned information or performing service provisioning procedure per clause 8.3 of the present document. Upon selecting T-EES, the EEC discovers and selects T-EAS by performing EAS Discovery per clause 8.5.2 of the present document.

4. The EEC sends the Application Context Relocation Request message (including the need to notify EAS) to the S-EES to initiate application context transfer between the S-EAS and the T-EAS. The S-EES authorises the request from the EEC. The S-EES decides to execute application context relocation based on the information received by the EEC and the information of EEC context or EAS profile, and then proceed to the below steps.

5. The S-EES applies the AF traffic influence with the N6 routing information of the T-EAS in the 3GPP Core Network and sends the Application Context Relocation Notify message to the S-EAS to initiate application context transfer between the S-EAS and the T-EAS.

6. The S-EAS transfers the application context to the T-EAS at implementation specific time. This process is out of the scope of the present specification.

7. The T-EAS sends the Application Context Relocation Complete message to the T-EES to confirm that the application context relocation has completed.

8. The S-EAS sends the Application Context Relocation Complete message to the S-EES to confirm that the application context relocation has completed.

9. The S-EES sends the Application Context Relocation Complete message to the EEC to confirm that the application context relocation has completed.

Editor's Note: Definition of the Information Flows in these procedures is FFS.

8.8.2.4 Source EAS Decided Application Context Relocation Scenario

Refer now to FIG. 15. The procedure in this clause illustrates the scenario for source EAS decided application context relocation.

In this procedure, the source EAS may detect the need of application context relocation locally or is notified by the source Edge Enabler Server. The source EAS make the decision about whether to perform the application context relocation, and starts the application context relocation at a proper time.

Editor's Note: It is FFS for the various events notified by S-EES.

The source Edge Application Server decided application context relocation scenario is outlined with four main phases: detection, decision, execution and clean up.

Phase I: Application Context Relocation Detection
1. The source Edge Application Server either receives notifications from source Edge Enabler Sever indicating that application context relocation may be required, or self detects the need for application context relocation (e.g. User Plane path change). The notification may contain the target Edge Application Server information.

NOTE 1: How the source Edge Application Server self detects the local need for application context relocation is outside the scope of this specification.

Editor's Note: Whether and what kind of EEC detection can be provided to EAS via EES is FFS.

Phase II: Application Context Relocation Decision
2. The source Edge Application Server makes the decision to perform the application context relocation NOTE 2: How the source Edge Application server determines when to start the application context relocation is outside the scope of this specification.

Phase III: Application Context Relocation Execution
3. If no target Edge Application Server is available at the source Edge Application Server, the source Edge Application Server discovers the target Edge Application Server as described in clause 8.8.2.

4. The source Edge Application Server applies the AF traffic influence with the N6 routing information of the T-EAS in the 3GPP Core Network and transfers the application context to the target Edge Application Server as per the time decides as per implementation. This process is out of the scope of the present specification.

Editor's Note: It is FFS whether application context can be transferred via the Edge Enabler Layer.

Phase IV: Post Clean Up after Application Context Relocation
5. All required entities perform clean-up.

Editor's note: Whether to inform the EEC as a post-application context relocation action at phase IV is FFS.

Editor's Note: Detailed operation for cleaning up at each entity is FFS.

8.8.2.5 Source EES Executed Application Context Relocation

FIG. 16 illustrates the procedure for the S-EES to decide and execute the application context relocation from the S-EAS to the T-EAS.

Pre-Condition:
1. The AC at the UE already has a connection to the S-EAS; and
2. The EEC is able to communicate with the S-EES.

Specific Changes:
1. Detection entities (S-EAS, S-EES) detects that application context relocation may be required. The detection trigger in S-EES may be the User Plane path change (late) notification received from the 3GPP Core Network.

Editor's Note: It is FFS whether the S-EAS performs T-EAS discovery and provides the S-EES with the information of the T-EAS and T-EES before informing the S-EES of the detected entities.

Editor's Note: It is FFS how detection entities (e.g., S-EAS, S-EES) detect the event which requires application context relocation.

2. The detection entity informs the S-EES that application context relocation is required.

3. The S-EES authorises the received message from step 2. The S-EES decides to execute application context relocation based on the information received in step 2 and the information of EEC context or EAS profile, and then proceed to the below steps.

Editor's Note: Detailed decision criteria is FFS.

Editor's Note: Gathering consent from other EDGEAPP entities is FFS.

4. The S-EES determines T-EES and T-EAS either from provided information in step 2, or via the Discover target Edge Application Server procedure in clause 8.8.3.2 of the present document. The S-EES may decide not to perform application context relocation if T-EAS is not available.

5. The S-EES applies the AF traffic influence with the N6 routing information of the T-EAS in the 3GPP Core Network and sends the Application Context Relocation Notify message to the S-EAS to initiate application context transfer between the S-EAS and the T-EAS.

6. The S-EAS transfers the application context to the T-EAS at implementation specific time. This process is out of the scope of the present specification.

7. The T-EAS sends the Application Context Relocation Complete message to the T-EES to confirm that the application context relocation has completed.

8. The S-EAS sends the Application Context Relocation Complete message to the S-EES to confirm that the application context relocation has completed.

9. The S-EES sends the Application Context Relocation Complete message to the EEC to confirm that the application context relocation has completed.

Editor's Note: Definition of the Information Flows in these procedures is FFS.

8.8.2.6 Target EES Executed Application Context Relocation

FIG. 17 illustrates the procedure for the target Edge Enabler Server to execute the application context relocation from the source Edge Application Server to the target Edge Application Server.

Pre-Condition:

1. The target EES has determined or been provided with the information about the source EES and the EEC; and
2. The EEC gets the target EES information from ECS or previously provisioned EES information.

Specific Changes:

1. The EEC detects that application context relocation may be required and decides to proceed required procedures for application context relocation.

Editor's note: Clarification on detection and decision methods is FFS. It is also FFS whether AC is involved in the decision.

2. The T-EES is informed by the EEC that the Application Context Relocation may be required.

3. The T-EES discovers T-EAS and applies the AF traffic influence with the N6 routing information of the T-EAS in the 3GPP Core Network, then sends the Application Context Relocation Request message to the T-EAS. The T-EAS initiates application context transfer between the S-EAS and the T-EAS. This process is out of the scope of the present specification.

Editor's note: It is FFS whether the T-EES informs the EEC of the discovered T-EAS and asks for consent. Also, gathering consent from other EDGEAPP entities is FFS.

Editor's note: The step 2 may be repeated if no candidate T-EAS is found, It is FFS whether it is more appropriate to let T-EES perform EAS discovery involving other EES(s) retrieved from ECS and inform the S-EAS via S-EES to initiate application context transfer.

4. The T-EAS sends the Application Context Relocation Complete message to the T-EES to confirm that the application context relocation has completed.

5. The T-EES sends the Application Context Relocation Complete message to the EEC.

6. All required entities perform clean-up operations.

Editor's note: Detailed post Application Context Relocation actions including clean-up operations are FFS.

Editor's note: Information flows of the procedure are FFS.

8.8.3.x Application Context Relocation Procedure

FIG. 18 illustrates the procedure for the EEC triggered application context relocation procedure.

Pre-Condition:

1. The Edge Enabler Client has the Target Edge Application Server information that will be used for application traffic; and
2. The Edge Enabler Client has been authorized to communicate with the Edge Enabler Server.

Specific Changes:

1. The Edge Enabler Client sends an Application Context Relocation request message (UE identity, target EAS endpoint, DNAI of the target EAS, EAS notification indication) to the Edge Enabler Server in order to start application context relocation (e.g. influence the application traffic, notify the EAS).

2. The Edge Enabler Server checks if the Edge Enabler Client is authorized for this operation for the UE. If authorized, then the Edge Enabler Server applies the AF traffic influence with the N6 routing information of the T-EAS in the 3GPP Core Network.

3. If the EAS notification indication is set in step 1 and the EAS has subscribed to receive such notification, the Edge Enabler Server shall notify the EAS about the need to start application context relocation.

3. The Edge Enabler Server responds to the Edge Enabler Client's request with an Application Context Relocation response message (result) to the Edge Enabler Client.

8.8.4.x Application Context Relocation Request

Table 8.8.4.x-1 describes information elements for the Application Context Relocation request sent from the EEC to the EES.

TABLE 8.8.4.x-1

Application Context Relocation Request

| Information element | Status | Description |
|---|---|---|
| EEC ID | M | Unique identifier of the EEC. |
| Security credentials | M | Security credentials resulting from a successful authorization for the edge computing service. |

TABLE 8.8.4.x-1-continued

Application Context Relocation Request

| Information element | Status | Description |
|---|---|---|
| UE identifier | M | The identifier of the UE (i.e. GPSI). |
| Target EAS endpoint | M | Target EAS Endpoint information (e.g., URI, FQDN, IP 3-tuple) of the target EAS. |
| DNAI of the target EAS | M | DNAI information associated with the target EAS. |
| EAS notification indication | M | Indicates whether to notify the EAS about the need of application context relocation. |

8.8.4.y Application Context Relocation Request

Table 8.8.4.y-1 describes the information elements for the Application Context Relocation response sent from the EES to the EEC.

TABLE 8.8.4.y-1

Application Context Relocation response

| Information element | Status | Description |
|---|---|---|
| Result | M | Indicates whether the operation is successful or failure |
| Cause information (NOTE) | O | Indicates the cause information for the failure |

(NOTE):
The Cause information IE is included when the Result indicates failure.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by an EDN for enabling ACR is provided. The method includes receiving (900) an ACR request message from a UE that initiates an ACR. The ACR request message comprises one or more of a UE ID, a T-EAS information (e.g., T-EAS endpoint (e.g., URI, FQDN, IP 3-tuple) and a DNAI of the T-EAS), and an EAS notification indication. The method also includes determining (902) whether the UE is authorized to perform the ACR. The method also includes applying (904) AF influence in a CN in response to determining that the UE is authorized to perform the ACR. The method also includes sending (906) an ACR response message to the UE to indicate a result of the ACR.

Embodiment 2: receiving (900) the ACR request message comprises receiving (900-1) the ACR request message by an S-EES in the EDN; determining (902) whether the UE is authorized to perform the ACR comprises determining (902-1) by the S-EES whether an EEC in the UE is authorized to perform the ACR; applying (904) AF influence comprises sending (904-1) N6 routing information (e.g., IP address and port number) of the T-EAS in the CN; and sending (906) the ACR response message comprises sending (906-1) the ACR response message from the S-EES in the EDN.

Embodiment 3: applying (904) AF influence further comprises notifying (904-2) the S-EAS to start the ACR if the ACR request message includes the EAS notification indication.

Embodiment 4: applying (904) AF influence further comprises discovering (904-3) the T-EAS by a T-EES in the EDN and applying (904-4) the AF influence with the N6 routing information of the T-EAS in the CN.

Embodiment 5: A method performed by a UE for enabling ACR is provided. The method includes providing (1002) an ACR request message to an EDN (e.g., EES) to initiate an ACR, wherein the ACR request message comprises one or more of a UE ID, a T-EAS, a DNAI of the T-EAS, and an EAS notification indication. The method also includes receiving (1004) an ACR response message from the EDN that indicates a result of the ACR.

Embodiment 6: the method also includes determining (1000) the T-EAS in the EDN to be used for applying AF influence by an EEC in the UE.

Embodiment 7: providing (1002) the ACR request message to the EDN comprises providing (1002-1) the ACR request message to a S-EES in the EDN; and receiving (1004) the ACR response message comprises receiving (1004-1) the ACR response message from the S-EES.

Embodiment 8: A User Equipment (UE) configured to communicate with a base station, the UE comprising a radio interface and processing circuitry configured to perform the method in any of the embodiments performed by the UE.

Embodiment 9: A base station configured to communicate with a User Equipment (UE), the base station comprising a radio interface and processing circuitry configured to facilitate an ACR between the UE and an EDN.

Embodiment 10: A communication system including a host computer comprising: processing circuitry configured to provide user data and a communication interface configured to forward the user data to a cellular network for transmission to a UE. The cellular network comprises a base station having a radio interface and processing circuitry, the base station's processing circuitry configured to facilitate an ACR between the UE and an EDN.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AC Application Client
ACR Application Context Relocation AF Application Function
AMF Access and Mobility Function
AN Access Network
AP Access Point
ASIC Application Specific Integrated Circuit
AUSF Authentication Server Function
CN Core Network
CPU Central Processing Unit
DN Data Network
DNAI Data Network Access Identifier
DSP Digital Signal Processor
EAS Edge Application Server
ECS Edge Configuration Server
EDN Edge Data Network
EEC Edge Enabler Client
EES Edge Enabler Server
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LADN Local Area Data Network
LTE Long Term Evolution
MME Mobility Management Entity
MTC Machine Type Communication
NEF Network Exposure Function
NF Network Function
NG-RAN Next Generation Radio Access Network
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
S-EAS Source Edge Application Server
S-EES Source Edge Enabler Server
SMF Session Management Function
T-EAS Target Edge Application Server
T-EES Target Edge Enabler Server
TCI Transmission Configuration Indicator
TRP Transmission/Reception Point
UDM Unified Data Management
UE User Equipment
ULCL Uplink Classifier
UP User Plane
UPF User Plane Function Those skilled in the art will recognize improvements and modifications to the embodiments of the present disclosure. All such improvements and modifications are considered within the scope of the concepts disclosed herein.

The invention claimed is:

1. A method performed by a User Equipment, UE, for enabling Application Context Relocation, ACR, comprising:
determining whether the ACR is needed in an Edge Data Network, EDN wherein the ACR is initiated by an Application Client, AC, and an Edge Enabler Client, EEC, in the UE, by determining that a Target-Edge Application Server, T-EAS, in the EDN needs to be used for an application traffic;
providing, from the EEC and to a Source-Edge Enabler Server, S-EES, a request message to request the ACR, the request message comprising: (i) an Edge Application Server, EAS, notification flag whether to notify a source EAS, S-EAS, that the ACR is needed; (ii) a UE Identification, UEID, (iii) a T-EAS endpoint, and (iv) a Data Network Access Identifier, DNAI, wherein the EAS notification flag is set to FALSE to cause the S-EES not to notify the S-EAS that the ACR is needed; and
receiving a response message from the S-EES that indicates a result of the ACR.

2. A wireless device comprising processing circuitry configured to cause the wireless device to:
determine whether an Application Context Relocation, ACR, is needed in an Edge Data Network, EDN, wherein the ACR is initiated by an Application Client, AC, and an Edge Enabler Client, EEC, in the UE, by determining that a Target-Edge Application Server, T-EAS, in the EDN needs to be used for an application traffic;
provide, from the EEC and to a Source-Edge Enabler Server, S-EES, a request message to request the ACR, the request message comprising: (i) an Edge Application Server, EAS, notification flag whether to notify a source EAS, S-EAS, that the ACR is needed; (ii) a UE Identification, UEID, (iii) a T-EAS endpoint and (iv) a Data Network Access Identifier, DNAI, wherein the EAS notification flag is set to FALSE to cause the S-EES not to notify the S-EAS that the ACR is needed; and
receive a response message from the S-EES that indicates a result of the ACR.

3. A method performed by a Source-Edge Enabler Server, S-EES, in an Edge Data Network, EDN, for enabling Application Context Relocation, ACR, wherein the ACR is initiated by an Application Client, AC, and an Edge Enabler Client, EEC, in a User Equipment, UE, the method comprising:
receiving, from the EEC, a request message to request the ACR, the request message comprising: (i) an Edge Application Server, EAS, notification flag whether to notify a Source-Edge Application Server, S-EAS that the ACR is needed, (ii) a UE Identification, UEID, (iii) a Target-EAS, T-EAS, endpoint, and (iv) a Data Network Access Identifier, DNAI, wherein the EAS notification flag is set to FALSE to cause the S-EES not to notify the S-EAS that the ACR is needed;
determining whether the UE is authorized to perform the ACR;
performing the ACR in response to determining that the UE is authorized to perform the ACR, and applying Application Function, AF, traffic influence with N6 routing information of the T-EAS in a core network, CN; and
sending a response message to the EEC to indicate a result of the ACR.

4. The method of claim 3, wherein performing the ACR further comprises providing the N6 routing information from a Target Edge Enabler Server, T-EES, to the T-EAS in the EDN.

5. A network node comprising processing circuitry configured to cause the network node to:
- receive, from the EEC, a request message to request the ACR, the request message comprising: (i) an Edge Application Server, EAS, notification flag whether to notify a Source-Edge Application Server, S-EAS that the ACR is needed, (ii) a UE Identification, UEID, (iii) a Target-EAS, T-EAS, endpoint, and (iv) a Data Network Access Identifier, DNAI, wherein the EAS notification flag is set to FALSE to cause the S-EES not to notify the S-EAS that the ACR is needed;
- determine whether the UE is authorized to perform the ACR;
- perform the ACR in response to determining that the UE is authorized to perform the ACR, and applying Application Function, AF, traffic influence with N6 routing information of the T-EAS in a core network, CN; and
- send a response message to the EEC to indicate a result of the ACR.

6. A method performed by a User Equipment, UE, for enabling Application Context Relocation, ACR, comprising:
- determining whether the ACR is needed in an Edge Data Network, EDN, wherein the ACR is executed by an Edge Enabler Client, EEC, in the UE, by determining that a Target-Edge Application Server, T-EAS, in the EDN needs to be used for an application traffic; and
- provide, from the EEC and to a Source-Edge Enabler Server, S-EES, a request message to request the ACR, the request message comprising: (i) an Edge Application Server, EAS, notification flag whether to notify a source EAS, S-EAS that the ACR is needed, (ii) a UE Identification, UEID, (iii) a T-EAS endpoint, and (iv) a Data Network Access Identifier, DNAI, wherein the EAS notification flag is set to TRUE to cause the S-EES to notify the S-EAS that the ACR is needed; and
- receiving a response message from the S-EES that indicates a result of the ACR.

* * * * *

UNITED STATES PATENT AND TRADEMARK OFFICE
CERTIFICATE OF CORRECTION

PATENT NO. : 12,166,842 B2
APPLICATION NO. : 18/029121
DATED : December 10, 2024
INVENTOR(S) : Wenliang Xu Page 1 of 1

It is certified that error appears in the above-identified patent and that said Letters Patent is hereby corrected as shown below:

On the Title Page

Item (57), under "Abstract", in Column 2, Line 3, delete "Change" and insert -- Relocation --, therefor.

In the Specification

In Column 2, Line 46, delete "Change" and insert -- Relocation --, therefor.

In Column 5, Line 45, delete "Access and Mobility Function" and insert -- Access and Mobility Management Function --, therefor.

In Column 6, Line 44, delete "CIV." and insert -- CN. --, therefor.

In Column 13, Line 30, delete "on" and insert -- one --, therefor.

In Column 21, Line 2, delete "Access and Mobility Function" and insert -- Access and Mobility Management Function --, therefor.

Signed and Sealed this
Twelfth Day of August, 2025

Coke Morgan Stewart
*Acting Director of the United States Patent and Trademark Office*